(12) United States Patent
Matheis

(10) Patent No.: US 7,014,393 B2
(45) Date of Patent: Mar. 21, 2006

(54) CLAMPING AND ADJUSTMENT APPARATUS FOR A CUTTING TOOL

(75) Inventor: Klaus Matheis, Sauldorf-Rast (DE)

(73) Assignee: Dr. Joerg Guehring, Albstadt (DE)

( * ) Notice: Subject to any disclaimer, the term of this patent is extended or adjusted under 35 U.S.C. 154(b) by 32 days.

(21) Appl. No.: 10/772,649

(22) Filed: Feb. 4, 2004

(65) Prior Publication Data
US 2004/0156688 A1 Aug. 12, 2004

(30) Foreign Application Priority Data
Feb. 7, 2003 (DE) .......................... 203 01 942 U
Mar. 28, 2003 (DE) .......................... 203 05 081 U

(51) Int. Cl.
B23B 29/02 (2006.01)

(52) U.S. Cl. .......................... 407/37; 407/44; 407/48; 407/86

(58) Field of Classification Search .................. 407/37, 407/40, 44, 45, 46, 48, 77, 85–87, 92, 103, 407/101; 83/698.51, 698.61, 699.31, 699.51; B23B 29/02
See application file for complete search history.

(56) References Cited

U.S. PATENT DOCUMENTS

| | | | |
|---|---|---|---|
| 3,088,141 A | | 5/1963 | Tansev |
| 3,188,718 A | * | 6/1965 | Wezel .......................... 407/36 |
| 3,195,376 A | | 7/1965 | Bader |
| 3,339,257 A | | 9/1967 | Hargreaves et al. |
| 3,408,722 A | * | 11/1968 | Berry, Jr. ...................... 407/46 |
| 3,497,934 A | * | 3/1970 | Arthur .......................... 407/78 |
| 3,591,305 A | * | 7/1971 | Aichhorn et al. ........... 408/161 |
| 3,662,444 A | * | 5/1972 | Erkfritz ........................ 407/41 |
| 3,792,517 A | * | 2/1974 | Gage ............................ 407/37 |
| 3,839,772 A | * | 10/1974 | Shimomura et al. .......... 407/36 |
| 3,847,555 A | * | 11/1974 | Pegler et al. .................. 407/36 |
| 4,211,507 A | * | 7/1980 | Kress et al. ................... 407/37 |
| 4,533,281 A | * | 8/1985 | Lacey ........................... 407/36 |
| 4,592,680 A | * | 6/1986 | Lindsay ........................ 407/36 |
| 4,602,899 A | * | 7/1986 | Vig ............................. 408/153 |
| 5,120,166 A | * | 6/1992 | Woerner ....................... 407/12 |
| 5,188,490 A | * | 2/1993 | Muendlein et al. ......... 408/146 |
| 5,209,610 A | * | 5/1993 | Arai et al. .................... 407/36 |
| 5,709,510 A | | 1/1998 | Scheer |
| 5,863,156 A | * | 1/1999 | Satran et al. ................. 407/36 |

(Continued)

FOREIGN PATENT DOCUMENTS

DE 2 312 077 9/1974

(Continued)

*Primary Examiner*—Boyer D. Ashley
*Assistant Examiner*—Sara Addisu
(74) *Attorney, Agent, or Firm*—Boyle Fredrickson Newholm Stein & Gratz S.C.

(57) ABSTRACT

A clamping and adjustment apparatus for a cutting tool is described in which a plate-shaped cutter insert is prestressable and fastenable by means of a tension screw with its bottom surface against a seat surface such that it is supported with lateral wall sections in a positionally fixed manner on a cutter support. In order to allow precise adjustment of the cutter insert when little space is available, the clamping and adjustment apparatus has an adjustment wedge which can be actuated by means of a pressure screw in a direction (V) that extends essentially parallel to the seat surface. The adjustment wedge is accommodated in the cutter support in a form-fitted and displaceable manner. The cutter insert is supported on the adjustment wedge and can be adjusted by means of it. Moreover, a tool which is equipped with this clamping and adjustment apparatus is described as well as a tool cartridge which is used for it.

35 Claims, 12 Drawing Sheets

U.S. PATENT DOCUMENTS 5,868,529 A * 2/1999 Rothballer et al. .......... 407/36
6,155,753 A    12/2000 Chang

FOREIGN PATENT DOCUMENTS

| DE | 26 15 913    | 10/1977 |
| DE | 28 06 079    | 3/1979  |
| DE | 44 03 188 A1 | 8/1995  |
| DE | 44 30 197 C2 | 3/1996  |
| DE | 101 08 103 A1 | 8/2002 |
| FR | 2 651 703    | 9/1989  |
| GB | 210917       | 2/1924  |
| JP | 10-277839    | 10/1998 |

* cited by examiner

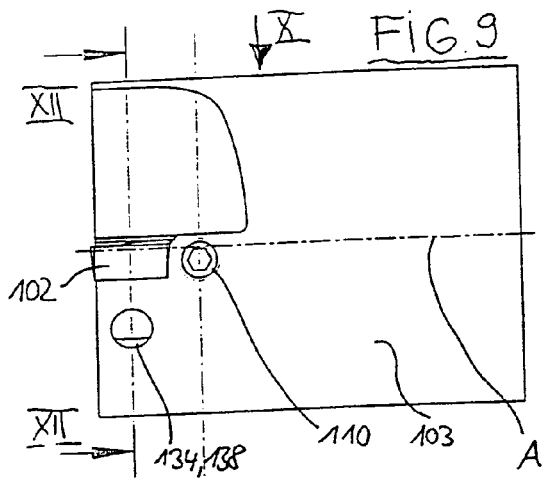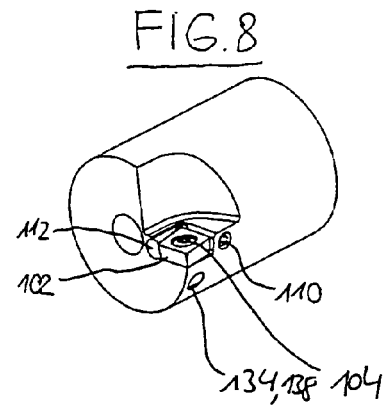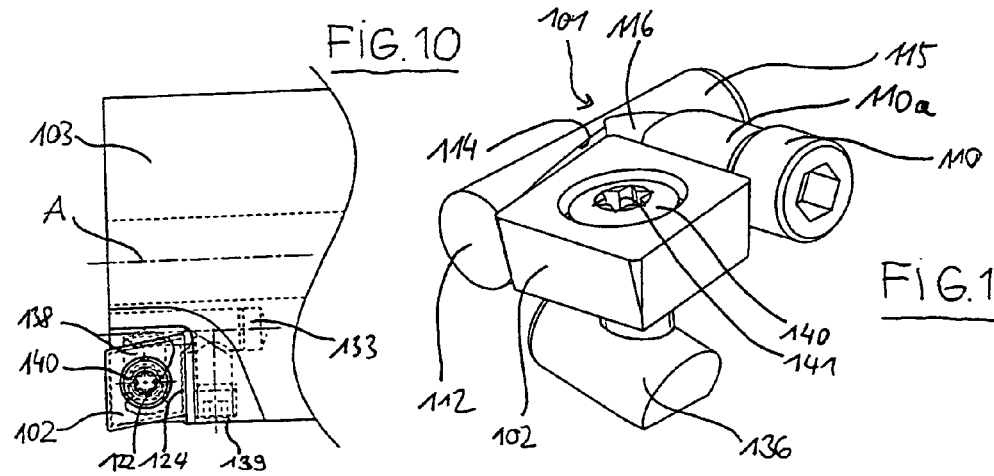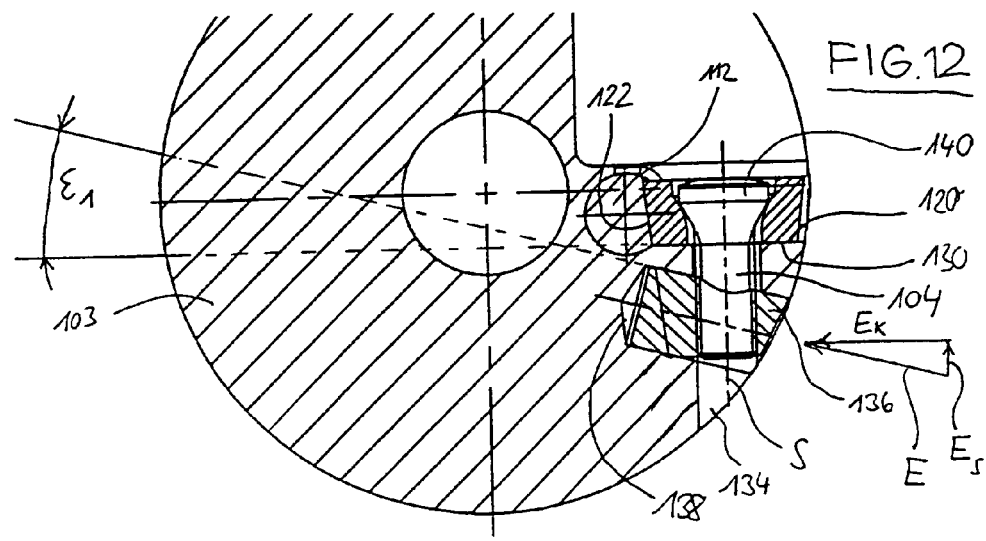

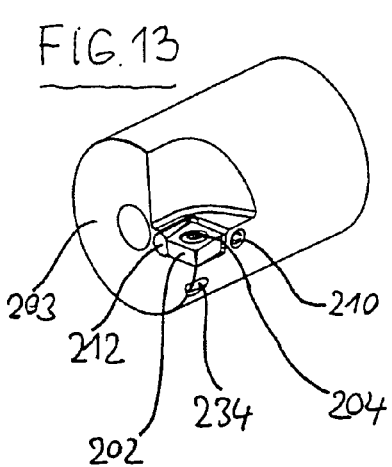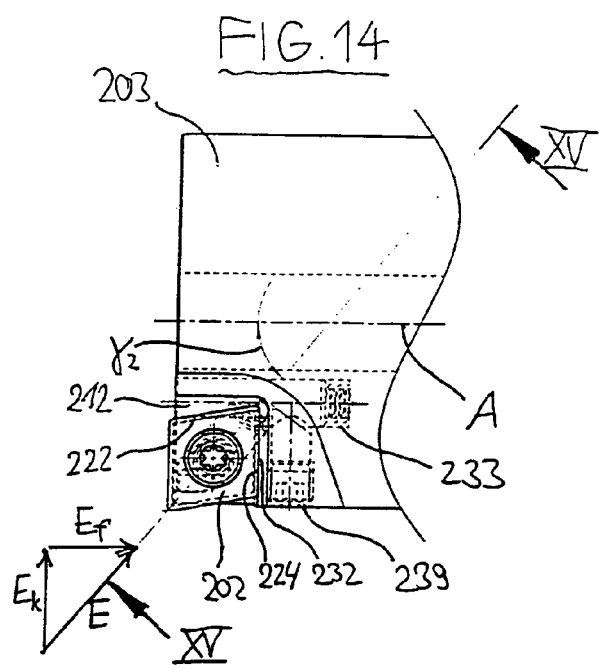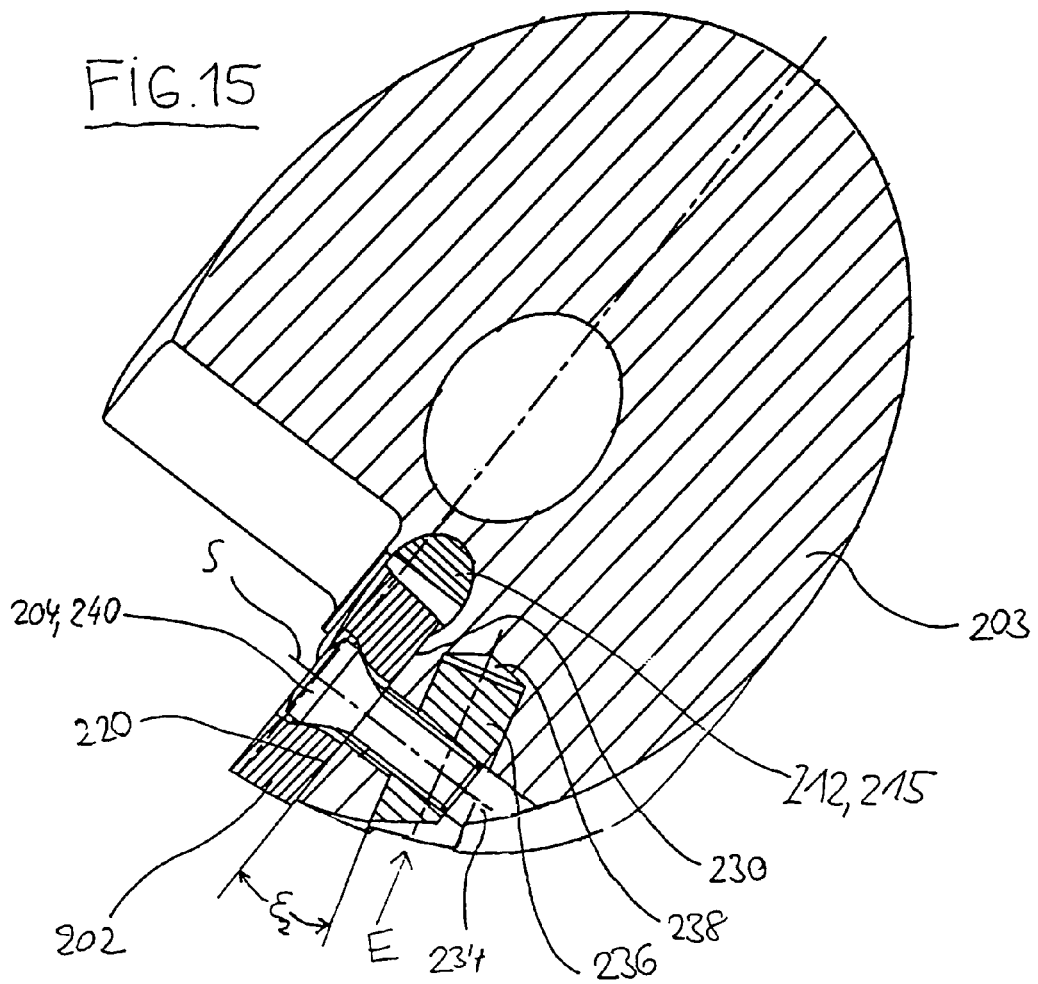

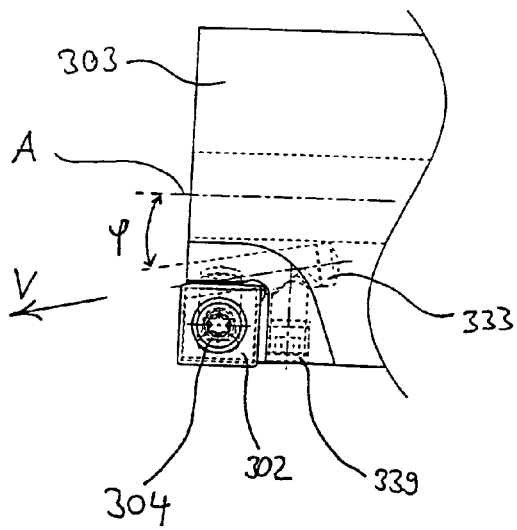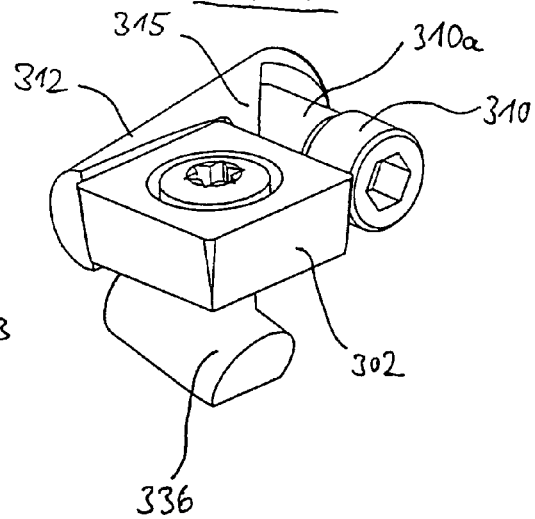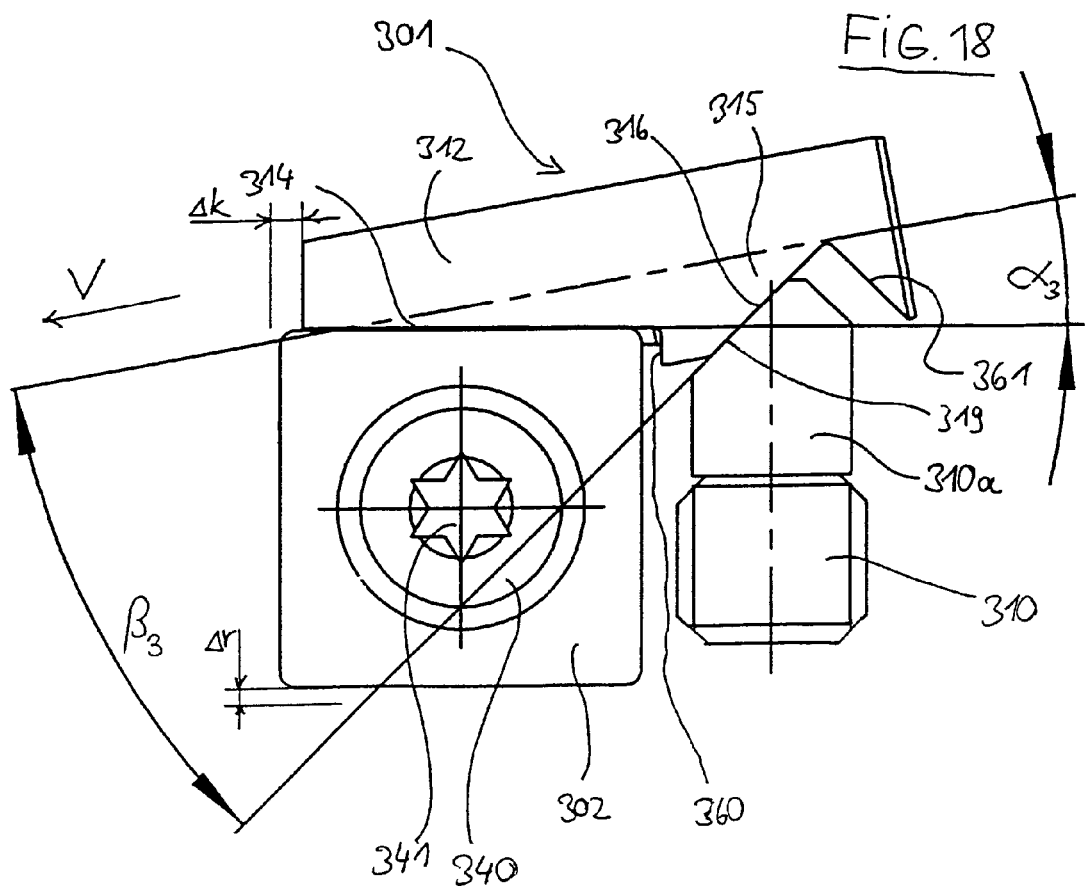

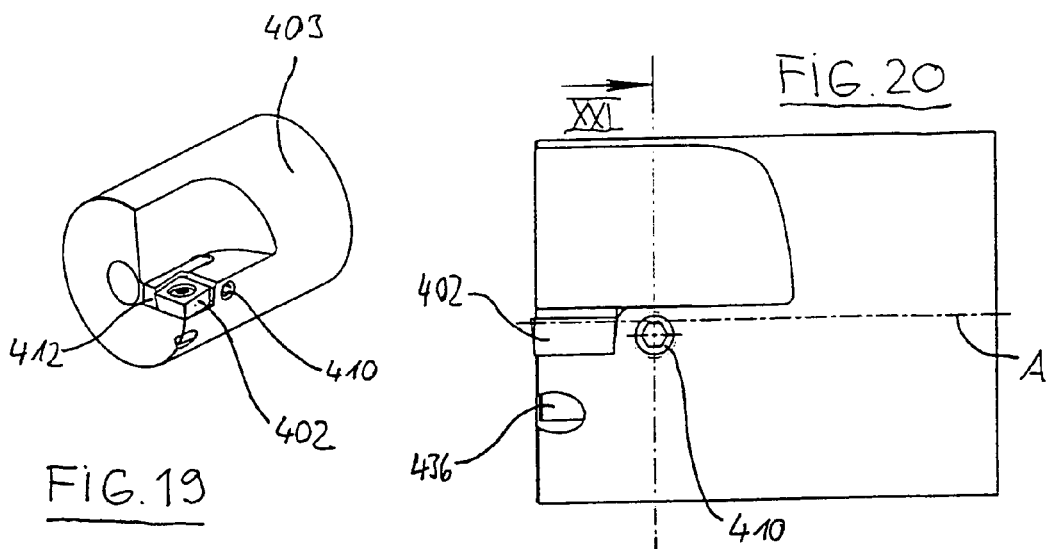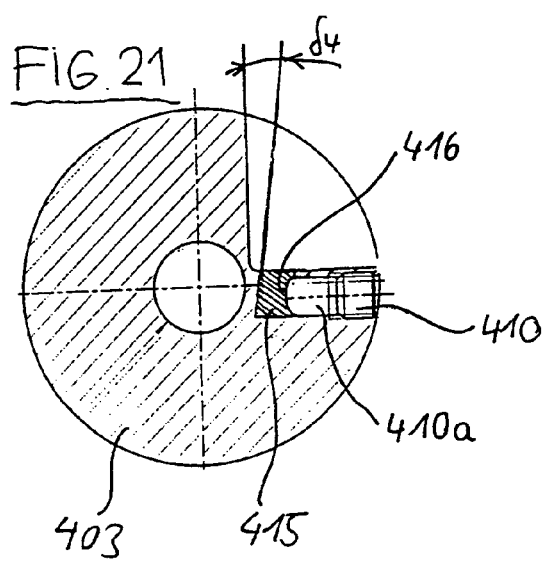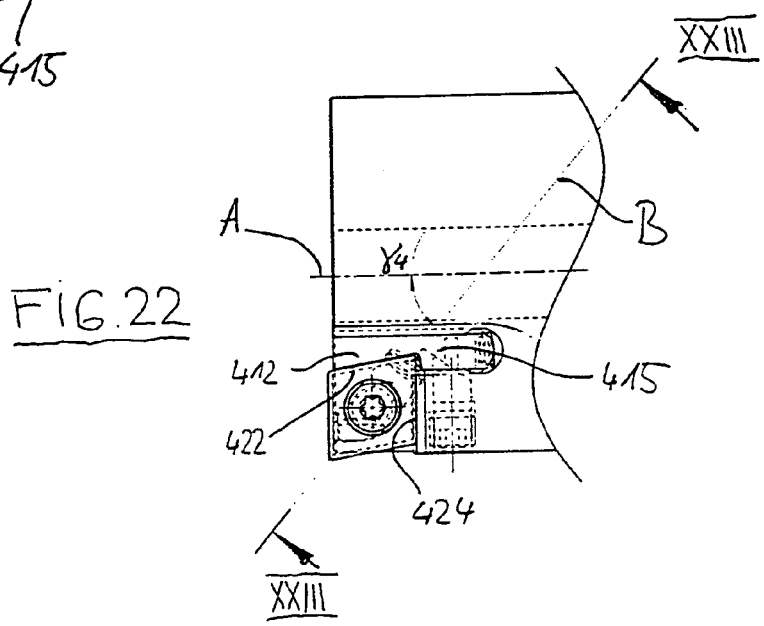

CLAMPING AND ADJUSTMENT APPARATUS FOR A CUTTING TOOL

BACKGROUND OF THE INVENTION

1. Field of the Invention

The invention concerns a clamping and adjustment apparatus for a cutting tool, as well as a corresponding cutting tool and a tool cartridge for a cutting tool.

2. Description of Related Art

In generic tools of this sort, the cutters are not located directly on the tool itself but rather on corresponding cutter inserts, particularly exchangeable inserts which are screwed down on the tool. Cutter supports such as cartridges which are fastened to the tool and support corresponding cutting inserts are also known.

Through the use of such cutting inserts, a decoupling of the material of the tool from the material on the cutters occurs which makes it possible to use certain expensive and hard cutting materials such as cermet or the like or coatings such as diamond, whereas the tool shank can be manufactured from a ductile, less expensive material. The important question here concerns a fine setting of the axial or radial position of the cutting edge(s) of the cutting insert with respect to the tool axis in order to obtain on the one hand cost effects due to greater manufacturing tolerances in the cutting insert manufacture and on the other hand to be able to compensate for the wear on the cutting edges during usage as well as—at least to a small extent—other measurement or adjustment accuracies.

In this connection, a single-cutter reamer with an exchangeable cutting edge has already been proposed in the patent document DE 1 752 151 in which an adjusting screw is used to actuate a tightening wedge in order to press on the lateral surface of a cutting blade so that it is adjustable in terms of its radial position. The cutting edge is squeezed using binding screws in its approximate position while the fine adjustment takes place by means of the adjusting screw and the tightening wedge. The adjusting and binding screws extend radially through the entire tool member.

Moreover, a milling cutter is known from US document U.S. Pat. No. 3,662,444 whose cutting inserts are clamped using screws against an insert seat; since the threaded hole does not run under the insert seat at a 90° angle to the support surface but rather at a certain angular offset, a contact force acts in the direction on the radially inside lateral wall on the insert seat, the insert being prestressed against the lateral wall in this manner. In the radial direction, the insert is supported on a guide surface. The radially inside lateral wall is formed by an actuatable tightening wedge which presses with its wedge surface against the insert, it being possible to finely adjust the radial position of the insert in this manner. The tightening wedge is formed as a sleeve. The actuation of the tightening wedge sleeve takes place by means of a differential screw with which the tightening wedge sleeve is screwed down essentially axially with the tool so that when tightening the screw, the wedge surface of the tightening wedge presses against the insert and forces it radially outwards under corresponding bending of the insert threaded joint.

Further clamping or rather adjustment apparatuses for clamping and finely adjusting cutter inserts in cutting tools have been disclosed, for example, in the following documents: DE 197 25 219 A1, DE 195 21 599 A1, U.S. Pat. No. 6,155,753, U.S. Pat. No. 3,339,257, U.S. Pat. No. 3,195,376, DE 4403188, DE 2806079 and JP 10277839.

Starting out from U.S. Pat. No. 3,662,444, the object of the invention is to create a clamping and adjustment apparatus for a generic tool which allows accurate adjustment while requiring only a small amount of space. Moreover, the object of the invention is to further develop a generic tool as well as a corresponding tool cartridge in such a manner that a greater fine adjustment range can be achieved with decreased loading on the attachment of the cutter insert.

SUMMARY OF THE PRESENT INVENTION

This objective is solved in terms of the clamping and adjustment apparatus with the features described below, in terms of the tool with the features described below and in terms of the tool cartridge with the features described below.

In order to restrain cutter inserts on corresponding cutter insert seats on cutting tools such as drills, step drills, reamers, face plano-milling cutters, etc. in a dimensionally accurate manner, the cutter inserts are prestressed with a prestressing and fastening device against a seat surface, the prestressing taking place in a manner such that the cutter inserts are supported in a positionally fixed manner on the respective cutter support. For example, an exchangeable cutting insert is screwed down with a tension screw on a corresponding tool support, the threaded hole under the cutting insert to the through hole through the cutting insert being shifted slightly to the lateral edges of the cutting insert seat so that when the tension screw is screwed in the cutting insert is pressed not only against the seat surface of the cutting insert seat but also with its lateral walls against the lateral edges of the cutting insert seat. The cutting insert is thus fastened on the cutter support in a positionally fixed manner.

Due to manufacturing tolerances in the cutter support as well as in the cutting insert, wear during operation, etc., it is necessary particularly in fine machining tools to be able to adjust the cutting insert precisely to the nominal dimensional. According to the invention, as a clamping and adjustment apparatus for such cutter inserts, an adjustment wedge is proposed which is accommodated in the cutter support in a form-fitted and displaceable manner and by means of which the cutter insert is supported. The adjustment wedge can be actuated by means of a pressure screw in a direction that extends essentially parallel to the seat surface.

Due to the actuation or rather adjustment direction of the adjustment wedge provided in parallel to the seat surface, a space-saving arrangement is achieved so that the clamping and adjustment apparatus according to the invention can also be used with small tool diameters or at the step of step tools. Moreover, in case of arrangement of the adjustment wedge in a direction extending essentially parallel to the seat surface in a plate-shaped cutter insert, very fine regulation of the adjustment force exerted using a pressure screw on the adjustment wedge and transferred by it to the cutting insert and thus to the prestressing device of the cutter insert can be achieved. In this manner, the adjustment of the cutting insert can take place with extremely stringent tolerances.

After the cutting insert has been adjusted to its dimension (depending on the purpose of the application, the adjustment can take place both in the axial and also in the radial tool direction), the cutting insert or rather the plate-shaped cutter insert is fastened using the prestressing and fastening apparatus in its final position. In an advantageous manner, the prestressing and fastening apparatus has a grip head with which a first lateral wall section of the cutter insert is pressed during prestressing or fastening against an adjustment wedge surface of the adjustment wedge. For example, a tension screw under pretension is tightened in the displaced thread mentioned above. However, a grip head having a screw head is also imaginable which has a corresponding cam with which the pressure is applied on the cutter insert. In this manner, a well fitted and two-dimensional abutment of the adjustment wedge on the lateral wall of the cutter insert is guaranteed.

In another advantageous embodiment, the cutter support has moreover a guide stop arrangement on which a further lateral wall section of the cutter insert comes to lie. The prestressing and fastening apparatus is formed so that the cutter insert is pressed with its second lateral wall section against the guide stop arrangement when it is prestressed and fastened. The guide stop arrangement is formed preferably as a guide surface. Overall, a completely determined supporting of the cutter insert is thus achieved which is supported with its bottom surface on the seat surface, with a first lateral wall or rather a first lateral wall section on the adjustment wedge surface and with a second lateral wall or rather a second lateral wall section formed at an angle thereto on the guide stop arrangement or rather on the guide surface. Here, a further advantage of the adjustment direction extending parallel to the seat surface according to the invention of the adjustment wedge comes to light: By adjusting the adjustment wedge in the direction on the cutting insert, there arises on the wedge surface of the adjustment wedge a force which is perpendicular to the wedge surface, i.e., in the direction perpendicular to the first lateral wall of the cutting insert. In addition, there arises due to friction, however, also a force in the adjustment direction, i.e., along the wedge surface and thus to the second lateral wall of the cutting insert. In this manner, there is achieved not only a displacement of the cutting insert under the influence of the force acting perpendicular to the first lateral surface but also an additional pressure of the cutting insert on the guide surface, particularly in essentially rectangular or diamond-shaped cutting inserts.

If the adjustment wedge is arranged according to the invention, the adjustment wedge runs moreover along the longitudinal direction of the corresponding lateral surface or rather lateral wall of the cutting insert so that the side on which the pressure force of the pressure screw is introduced into the adjustment wedge can be relatively small and thus a high pressure on the surface and thus a highly concentrated and thus bend- and torsion-free force introduction into the adjustment wedge can occur. The tightening wedge extends behind the first lateral wall of the cutter insert in a flat manner and allows, despite its space-saving construction, a high force transfer to the cutting insert.

A particularly slim construction can be achieved with small wedge angles between the actuation direction of the adjustment wedge and the adjustment wedge surface. In this manner, a stepping down of the tightening wedge movement on the cutting insert is achieved moreover so that the adjustment of the cutting insert can be precisely regulated. Wedge angles between 5° and 25° have proven to be particularly suitable, particularly between 5° and 15°.

The clamping and adjustment apparatus according to the invention can be used in face plano milling cutters or other tools in which the cutting inserts are arranged two-dimensionally on a front surface. However, it is particularly advantageous for use in tools such as drills or reamers in which the cutting insert or rather the cutting inserts are arranged in a two-dimensional manner in a plane perpendicular to the front surface of the tool. The thin adjustment wedge acting along the longitudinal direction of the lateral wall of the cutting insert can be arranged essentially in the axial direction so that a space-saving arrangement of the clamping and adjustment apparatus results in the radial direction of the tool and also in the circumferential direction of the tool, while there is sufficient room in the axial direction to accommodate the adjustment wedge.

The pressure screw for actuating the adjustment key can be provided, for example, in a threaded hole on the tool's front or bottom side coaxially to the adjustment wedge in order to actuate the adjustment wedge. However, it is advantageous if the pressure screw is arranged at an angle to the adjustment wedge and is pressed via an actuation wedge on the adjustment wedge since in this manner the pressure screw is also easily accessible on the peripheral side or can be screwed in from out of the flute into the tool. The clamping and adjustment apparatus according to the invention can thus be used also in tools in which an application of the pressure screw on the front or bottom side is impossible.

Here, the pressure screw is accommodated preferably in a radial hole emanating from the outer circumference of the tool and presses on an actuation wedge arranged coaxially to the adjustment wedge so that the essentially axial adjustment direction of the adjustment and the actuation wedge extends perpendicularly to the screw axis of the pressure screw. Depending on the space requirements, form of the cutting insert, the flute or the cutter support, however, an alternative configuration can be chosen.

Adjustment and actuation wedge can be implemented as separate coaxial wedge elements with their narrow sides striking one another. However, it is advantageous if the adjustment wedge and the actuation wedge are formed on a single-piece double wedge pin since in this manner a reliable force transfer from the pressure screw via the double wedge pin to the cutting insert and the cutting insert tension screw is ensured. The double wedge pin can be accommodated in a common guide, e.g., a blind drill hole or a milled groove which extends advantageously essentially in the axial direction, while the pressure screw is accommodated in a threaded hole which extends advantageously essentially in the radial direction.

Here, differently formed recesses can be provided on the single-piece double wedge pin depending on the form of the cutting insert which has its position adjusted by the adjustment wedge and on that of the actuating mechanism by means of which the pressure screw acts on the actuation wedge. In particular, in a cutting insert to be set, a configuration of the adjustment wedge is possible through a wedge-shaped exception on the double wedge since in this manner a two-dimensional abutment of the adjustment wedge on the cutting insert and thus a good force transfer ensues.

With regards to the actuation wedge, different configurations come into question: For example, the actuation wedge in another advantageous embodiment is arranged directly under the front surface of the pressure screw which has on the front side a cone, i.e., a conical-surface-plane pressure surface via which the force transfer to the actuation wedge takes place. In this case, the recess provided for the actuation wedge on the double wedge pin can likewise be formed conically. A conical recess of this sort can be produced in a simple manner by drilling with a drilling tool with a point angle corresponding to the desired cone angle to the desired depth in the double wedge pin; preferably, the point angle or rather the cone angle of the recess forming the actuation wedge is chosen to be the same as the cone angle of the conical surface pressure surface on the front side of the pressure screw since in this manner a line-shaped abutment of the pressure surface on the actuation wedge arises extending over the entire length from the point of the pressure screw to the screw circumference.

The pressure screw can be formed to be a single piece as a headless screw which can be screwed into the tool member or rather cutter support.

However, it would also be imaginable to form the pressure screw to be spherical. In particular, it could be achieved in this case through a suitable bending of the actuation wedge recess that the adjustment movement of the double wedge pin takes place first slowly with a small resistance and then quickly with a larger resistance or first quickly with a larger resistance and then slower with a smaller resistance. A configuration of the actuation wedge according to claim 10 as a wedge-shaped recess would also imaginable; a line-shaped support surface of a conical-surface-shaped pressure surface of the pressure screw can be brought about in this case too.

However, the configuration of the actuation wedge as a wedge-shaped recess has been proven particularly in conjunction with another advantageous embodiment in which the pressure screw is not pressed directly on the actuation wedge but rather via a intermediate pressure wedge. In this manner, an all-over abutment of the entire pressure surface, the pressure surface extending obliquely with respect to the axis of the pressure screw, of the pressure wedge on the actuation wedge is brought about.

The pressure screw can be formed as a headless screw so as to be capable of being screwed into the tool member or rather cutter support and press on the pressure pin guided coaxially in the drill hole.

Within the sense of a fine-motion or rather precise setting of the position of the cutting insert, it is moreover advantageous if the adjustment wedge angle is smaller than the actuation wedge angle so that the radial movement of the pressure screw, i.e., the spiral movement when screwing in the pressure screw is translated only underproportionally into a radial deflection of the cutting insert. In particular, adjustment wedge angles from 5° to 25° have proven to be advantageous as well as actuation wedge angles between 30° and 40°.

In another advantageous embodiment, the actuation wedge surface and the adjustment wedge surface are provided concavely on the double wedge pin. In this manner, the pressure screw forms a loss prevention for the double wedge pin which serves to counter a falling out of the double wedge pin from its guide when the cutting insert is removed. The pressure exerted via the pressure screw is translated into a pulling movement on the double wedge pin. The lateral wall of the cutting insert abutting on the adjustment wedge surface is situated at the wedge angle to the displacement direction of the double wedge so that the force transferred to this lateral wall forces the cutting insert simultaneously radially outwards and against the guide surface. With a double wedge pin of this sort, particularly a radial adjustment of cutting inserts is accomplished in which the lateral wall abutting on the adjustment wedge is tilted in the direction of the drawing movement of the double wedge at the wedge angle of the adjustment wedge, for example in diamond-shaped standard indexable inserts which are provided on the cutter support in such a manner that one of the pointed corners is surrounded by the adjustment wedge surface and the guide surface on the cutting insert seat.

In cutting inserts which have no slant or an opposite slant of the lateral wall abutting on the adjustment wedge with respect to the direction of the desired cutter adjustment, on the other hand a convex arrangement of the adjustment and the actuation wedge on the double wedge pin is advantageous. The pressure exerted by the pressure screw leads to a displacement of the adjustment wedge in the displacement direction determined by the wedge receptacle and thus to a pressure against the wall of the cutting insert so that in turn a radial excursion of the cutting insert occurs.

Particularly in a double wedge pin having concavely arranged wedge surfaces, it is advantageous if an ejection spring is provided which enables non-problematic removal of the double wedge pin when taking apart the tool.

A further aspect of the invention concerns a tool in which a tension screw is used for prestressing and fastening the cutting insert. In the adjustment apparatus according to the invention as well as in known adjustment apparatuses, a force arises through the excursion occurring during the adjustment of the cutting insert which force is introduced transversely to the screw axis of the tension screw into the grip head of the tension screw. Besides the bending moment caused by the prestressing of the cutting insert, there occurs thus an additional bending loading of the tension screw, thereby limiting the setting range of the clamping and adjustment apparatus. According to the invention, the tension screw is screwed through a through hole with a nut part which is movably supported in a nut part guide receptacle, the degree of freedom of the movement of the nut part in the nut part guide receptacle having a component perpendicular to the first lateral wall section. The transverse force introduced into the grip head of the tension screw can thus be deflected partially into a compensation movement of the nut part. The deflection of the tension screw is thus reduced and the force introduction of the force transferred to the tension screw is distributed over a larger area. It is thus possible in this manner to enlarge the adjustment range within which the position of the cutting insert is settable.

In an advantageous embodiment, the nut part is implemented as a cylinder bolt having a circumferential-side threaded hole for accommodating the tension screw which cylinder pin is displaceably supported in a drill hole drilled in the nut part guide direction from the outer circumference of the cutter support.

In cutter inserts which are supported (as explained above) on a second lateral wall section at an angle to the first lateral wall section on a guide surface, it is moreover advantageous if the guide direction of the nut part receptacle has a component in the direction of the second lateral wall section so that the nut part guide receptacle extends in the direction of the transverse force introduced into the tension screw. Also in a second adjustment device provided alternatively to the guide surface (e.g., for simultaneously axial and radial cutter position adjustment), this type of configuration of the nut part guide receptacle or rather of the nut part makes sense.

It has turned out that it is moreover advantageous if the guide direction of the nut part guide receptacle has a component in the direction of the axis of the tension screw since in this manner not only a good clamping action of the tension screw can be obtained but simultaneously also the setting range of the clamping and adjustment apparatus is simultaneously large. A ratio of the component in the direction of the axis of the tension screw to the remaining components of the guide direction from 10 to 50%, particularly 20 to 35%, e.g., 25 to 30%, has proven to be particularly advantageous.

The clamping and adjustment apparatus according to the invention and the restraint of the tension screw with the nut part according to the invention complement one another in a particularly advantageous manner since the fine setting enabled by the clamping and adjustment apparatus can be carried out in the large adjustment range obtained with the nut part screw connection.

The invention can be used advantageously particularly for cutter adjustment at the step of a step tool in which it is a matter of a clamping and adjustment apparatus that builds slightly in the radial direction and in which a central receptacle for restraining insert tools for the predrilling stage is necessary in the tool support which limits the available structural space.

Particularly in such step tools, tool cartridges are also used which accommodate corresponding cutter inserts or cutting inserts as an independent cutter support and can be attached on the tool basic member or rather support. Also in such tool cartridges, the clamping and adjustment apparatus according to the invention can be used advantageously.

Here, it would be imaginable to provide the adjustment wedge on the tool basic member and thus adjust the entire tool cartridge in its position with respect to the tool basic member. However, the tool cartridge is advantageously attachable at a fixed position on the tool basic member and has an adjustment wedge with which the position of the cutting insert on the tool cartridge can be adjusted. The tool basic member can thus have a simple design, the entire adjustment mechanics being housed on the tool cartridge. The tool cartridge in turn can be fastened at a fixed position by means of a tension screw on the tool or rather the tool basic member.

Further advantageous embodiments are the object of the further dependent claims.

BRIEF DESCRIPTION OF THE DRAWINGS

Preferred embodiments of the invention are explained in greater detail hereafter based on the shown drawings. The figures are as follows:

FIG. 8: A view corresponding to FIG. 1 of a tool according to a further embodiment of the invention;

FIG. 9: A view of this tool corresponding to FIG. 2;

FIG. 10: A top view in the direction of the arrow X drawn in FIG. 9;

FIG. 11: A detailed view corresponding to FIG. 6 of the clamping and adjustment apparatus shown in FIGS. 8 to 10;

FIG. 12: A sectional view in the plane XII—XII drawn in FIG. 9;

FIG. 13: A view corresponding to FIG. 1 of a tool according to a further embodiment of the invention;

FIG. 14: A top view of this tool corresponding to FIG. 5;

FIG. 15: A sectional view in the plane XV—XV drawn in FIG. 14;

FIG. 16: A top view corresponding to FIG. 5 of a tool according to a further embodiment of the invention;

FIG. 17: A detailed view corresponding to FIG. 6;

FIG. 18: A detailed view corresponding to FIG. 7;

FIG. 19: A view corresponding to FIG. 1 of a further embodiment of the invention;

FIG. 20: A lateral view corresponding to FIG. 2;

FIG. 21: A sectional view in the plane XX—XX drawn in FIG. 20;

FIG. 22: A top view corresponding to FIG. 5;

DETAILED DESCRIPTION OF THE PREFERRED EMBODIMENTS

In the following description of preferred embodiments of the invention, functionally identical or similar features in the shown embodiments were given similar reference numbers in order to ensure better clarity. In order to avoid repetitions, features of embodiments which are identical to those in the preceding embodiments are to some extent not designated anew in the figures.

Figure 1:
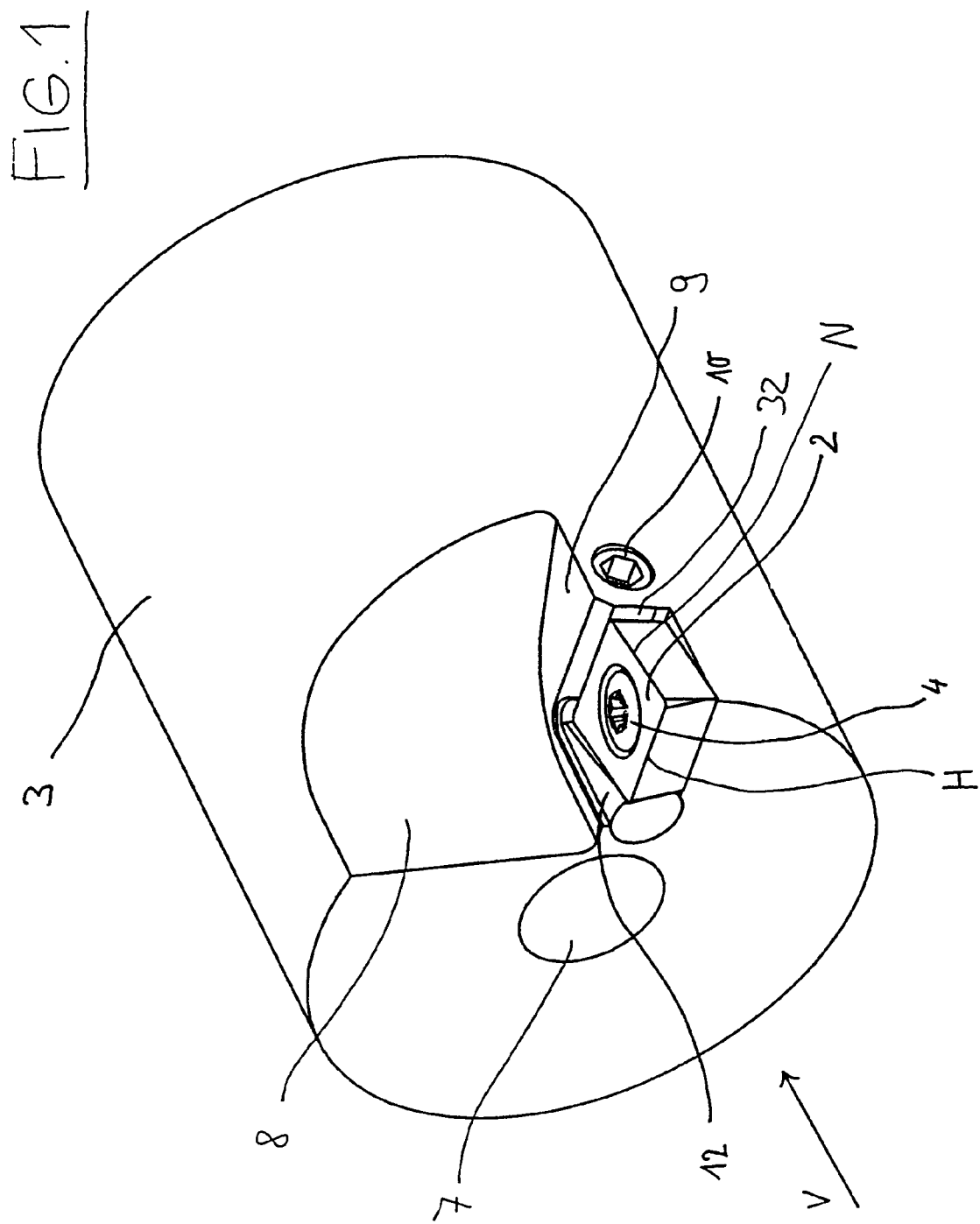
FIG. 1: An isometric view of a tool according to an embodiment of the invention.

First, reference is made to the embodiment of the invention shown in FIG. 1. Further details can be taken from FIGS. 2 to 7.

Figure 2:
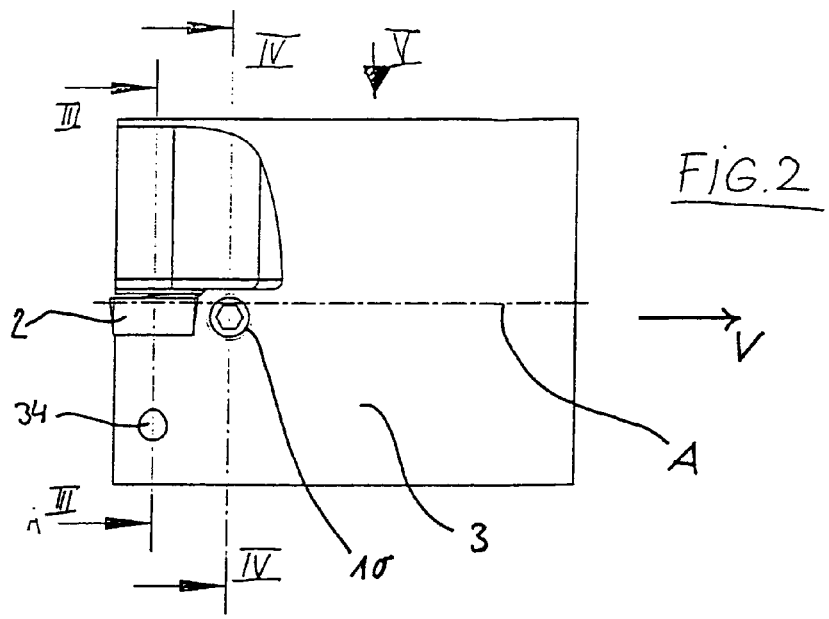
FIG. 2: A lateral view of the tool shown in FIG. 1.

In FIG. 1, a tool is designated as 1 which has a cutting insert seat on which a cutting insert 2 is screwed down with a tension screw 4. The tension screw 4 is screwed in a centric manner through the cutting insert 2. The adjustment wedge 12 can be adjusted by means of a pressure screw 10 in a displacement direction V and is supported on the tool 3. FIG. 2 shows the tool support 3 in a lateral view. The tool support axis is designated as A and the displacement direction of the adjustment wedge with V. It can be recognized that the displacement direction V extends coaxially with respect to the tool axis A. Below the cutting insert 2, the outlet of a through hole 34 is visible through which the screw 4 extends, as shown in the sectional view in FIG. 3. Axially behind the cutting insert 2, there is the pressure screw 10 which extends in the radial direction, as is shown in the sectional view in FIG. 4.

The cutting insert 2 is diamond-shaped and arranged so that it has a main cutter H extending essentially radially with respect to the tool axis and a minor cutter N extending at a taper axially with respect to the tool axis. A lateral surface 22 of the cutting insert 2 abuts on an adjustment wedge 12 and a second lateral surface 24 on a guide surface 32 so that one of its pointed corners is bordered by the adjustment wedge 12 and the guide surface 32.

The cutting insert 2 sits in a recess at the perimeter of the tool 3 which forms the flute, the cutting insert 2 along with a surface 9 forming the chip face and a surface 8 the chip free face. The surface 8 and the surface 9 as well as the seat of the cutting insert 2 are provided preferably with a hard material coating in order to prevent premature wear.

The adjustment wedge 12 consists of a hard metal which is preferably likewise provided with a hard material coating. However, other common materials would also be imaginable. Besides the adjustment wedge, the cutter support 3 can also consist of a hard metal. As a material for the cutter support 3 or the adjustment wedge 12, however, any of the other common materials used in modem high-performance drills would also be imaginable, such as high-speed steels such as HSS or HSSE, HSSEBM or sintered materials such as ceramics, cermet and the like.

Hard-material coatings are advantageous here which are preferably implemented to be think, the thickness of the coating preferably lying in the range between 0.5 and 3 μm. For the hard-material coating, all of the suitable materials can be considered, e.g., diamond, preferably nanocrystalline diamond, titanium nitride or titanium aluminum nitride. Particularly suitable are, i.a., a titanium aluminum nitride coating and a so-called multilayer coating which is marketed under the name "Fire I" by the company Gühring oHG. This is a TiN/(Ti,Al)N multilayer coating.

A wear protection coating can also be used in a particularly preferred manner, which coating consists essentially of nitrides with the metal components Cr, Ti and Al and preferably with a small share of elements for grain refining, the Cr share lying between 30 and 65%, preferably 30 to 60%, particularly preferred 40 to 60%, the Al share from 15 to 35%, preferably 7 to 25%, and the Ti share from 16 to 40%, preferably 16 to 35%, particularly preferred 24 to 35%, in each case referred to all metal atoms in the entire coating. The coating structure can have a single layer with a homogeneous mixed phase or it can consist of a plurality of homogeneous layers in and of themselves, consisting in alternation on the one hand of $(Ti_xAl_yY_z)N$ with x=0.38 to 0.5 and y=0.48 to 0.6 and z=0 to 0.04 and on the other hand of CrN, preferably the top layer of the wear protection coating being formed by the CrN layer.

The cutting insert 2 consists of cermet or another hard ceramic material and/or has a corresponding coating such as diamond or cubical boron nitride.

On the tool basic member or rather tool support 3, a centric drill hole 7 is provided into which a further insert tool can be spared by way of clamping means, not shown, known to one skilled in the art, e.g., a hydraulic expansion chuck so that the tool can be used as a step drill or rather as a step reamer.

The tension screw 4 has a grip head 40 by means of which the cutting insert 2 is pressed against the adjustment wedge 12 when the screw 4 is screwed into the drill hole 34. It can be recognized that in the through hole extending through the cutting insert 2, a play with respect to the screw 4 is provided. When screwing in the tension screw 4, a force acts via the grip head 40 on the inner side of the cutting insert 2 since the drill hole 34 is arranged at a small offset to the through hole in the cutting insert 2. The cutting insert 2 is forced on its lateral wall 22 against a wedge surface 14 of the adjustment wedge 12, the adjustment wedge 12 being supported in turn on a supporting surface 13 against the tool support 3. The wedge surface 14 has an angle ψ of about 7° with respect to the screw axis S. The angle ψ corresponds to the free angle of standard exchangeable cutting inserts so that a two-dimensional abutment of such exchangeable cutting inserts is guaranteed. The cutting insert 2 is supported with its bottom surface 20 on the seat surface 30 of the cutting insert seat in a two-dimensional manner.

Figure 3:
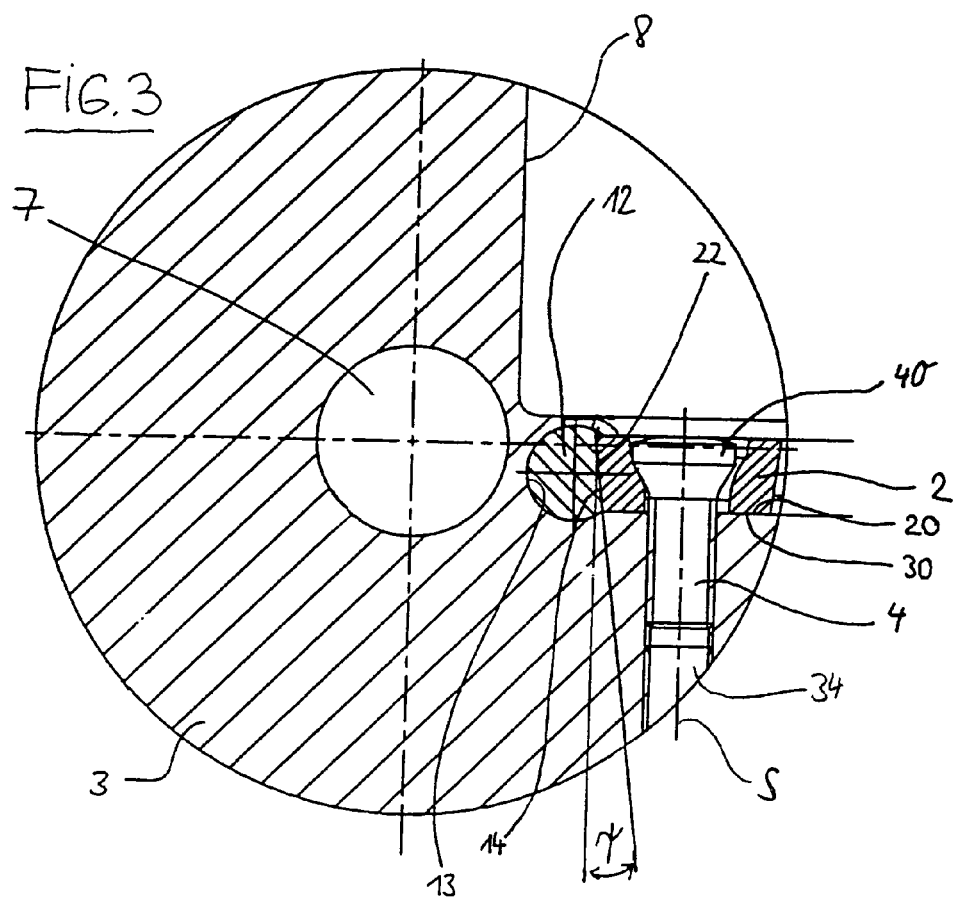
FIG. 3: A sectional view in the plane III—III drawn in FIG. 2.
Figure 4:
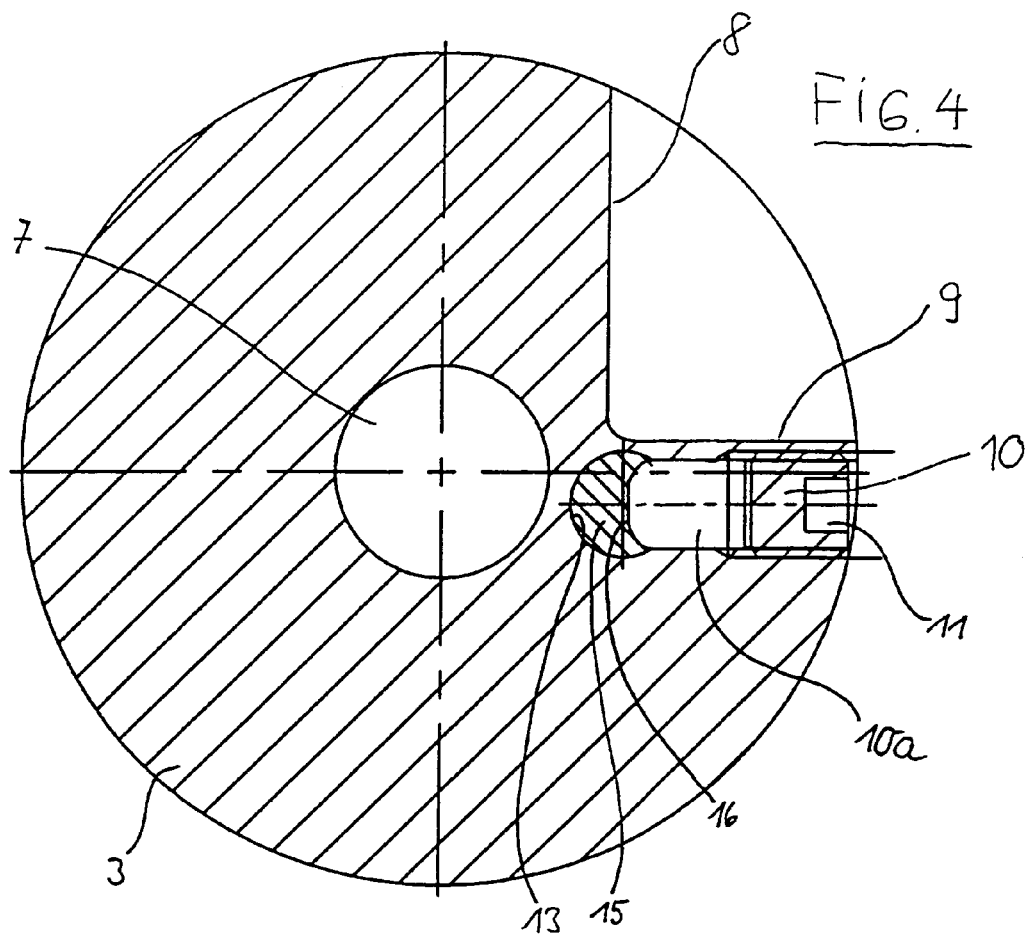
FIG. 4: A sectional view in the plane IV—IV drawn in FIG. 2.
Figure 5:
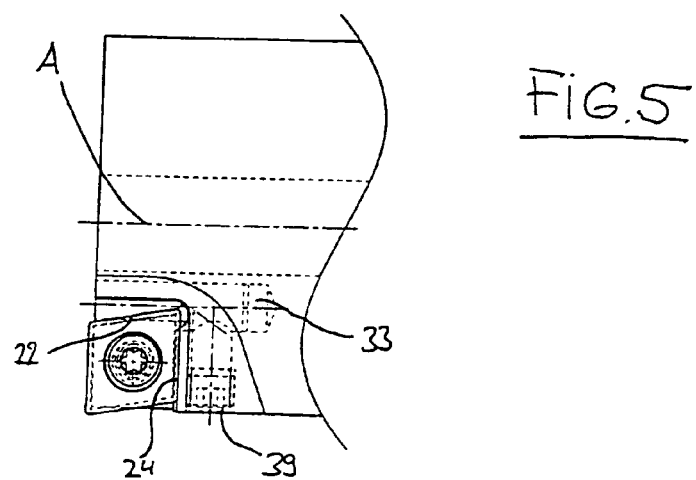
FIG. 5: A top view in the direction of the arrow V drawn in FIG. 2.

By displacing the adjustment wedge 12 in the direction through the page level in FIG. 3 or rather in the direction V, the cutting insert 2 is forced outwards, the cutting insert 2 exerting a bending moment via the grip head 40 on the screw 4. By screwing in the headless screw 10, a force transfer occurs via a pressure pin 10a on the actuation wedge 15. The pressure pin is somewhat rounded on the edges on its end which presses on the actuation wedge corresponding to a guide in the actuation wedge in order to ensure a good abutment. Thus, a fine adjustment of the radial position of the cutting insert can occur so that the tool can be set exactly to the nominal dimension of the drill hole. For example, in a tool with a diameter of 40 mm in a setting range of +/−0.05 mm, resolutions of <1/100 mm were attained.

Figure 6:
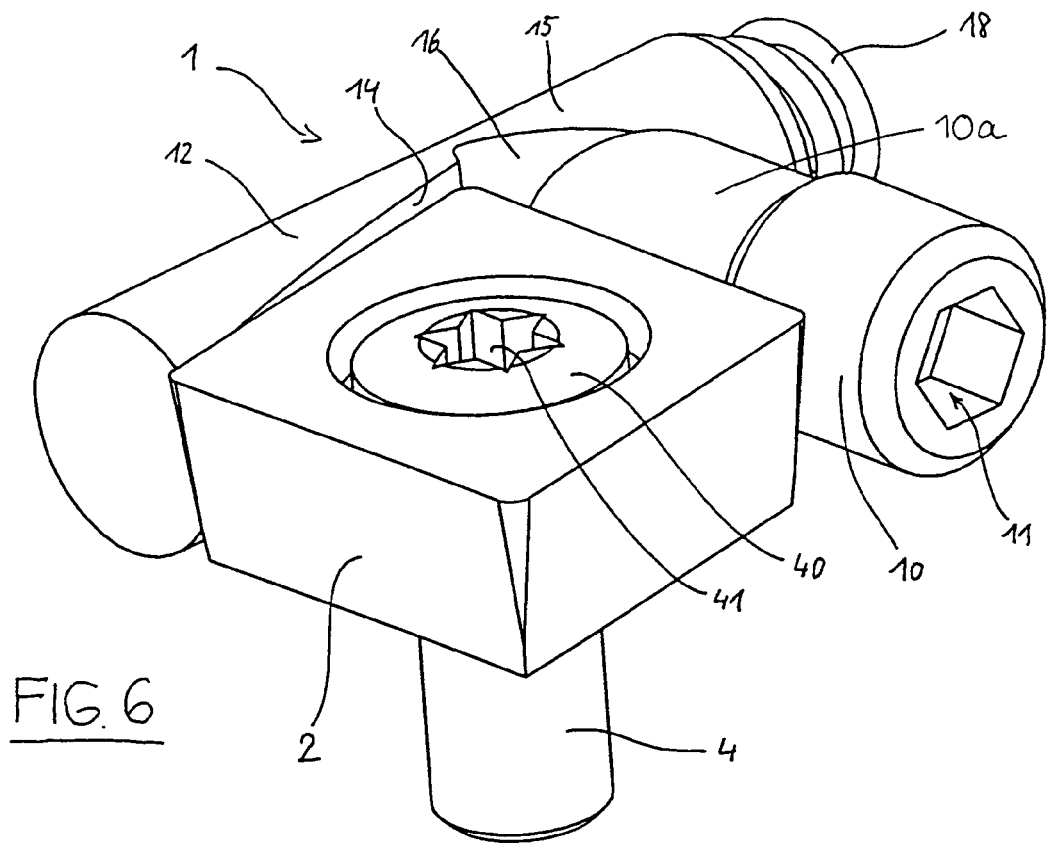
FIG. 6: An isometric detailed view of the clamping and adjustment apparatus shown in FIGS. 1 to 5.
Figure 7:
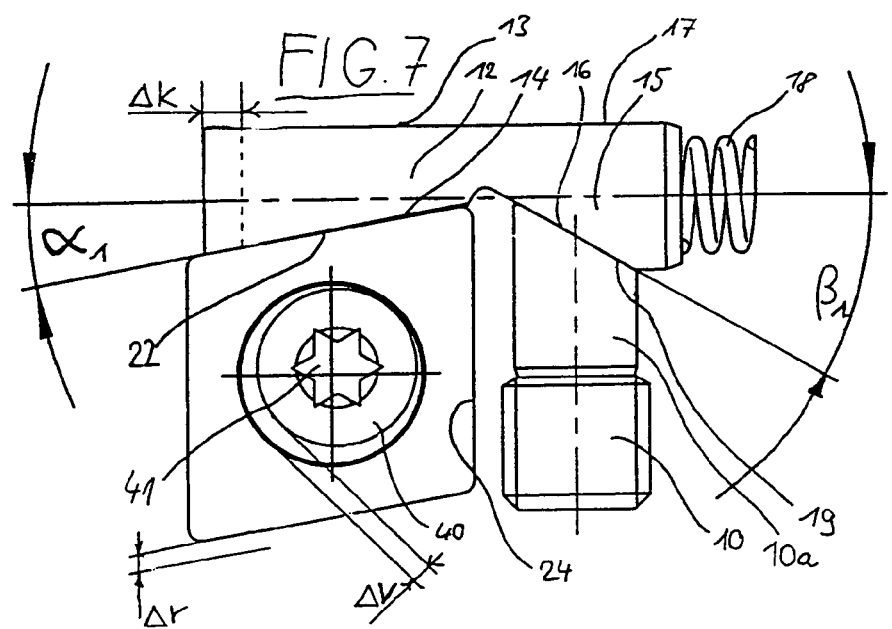
FIG. 7: A top view of the clamping and adjustment apparatus shown in FIG. 6.

The adjustment of the adjustment wedge 12 takes place by means of an adjustment mechanism or rather a clamping and adjustment apparatus which is shown in detail in FIGS. 6 and 7. The pressure screw 10 can be screwed in via a hexagon socket 11 into the tool support or rather basic member and presses via the pressure wedge 10a on an actuation wedge surface 16 of an actuation wedge 15 which is formed on a double wedge pin 12, 15 along with the adjustment wedge 12. When screwing in the pressure screw 10, the double wedge pin 12, 15 glides along the beveled pressure surface 19 of the pressure wedge 10a or rather of the actuation wedge surface 16 in the displacement direction V, i.e., axially in the tool direction A to the back or rather to the right in FIG. 7, the partial surface 14 of the adjustment wedge 12 being displaced by the value Δk in the axial direction as a result. In this manner, the cutting insert is displaced by the value Δr to the outside.

Here, the actuation wedge surface 16 has an angle β1 with respect to the displacement direction, the adjustment wedge surface 14 an angle α1. The angle α1 is equal to 15° in the shown embodiment so that the force component in the axial direction of the tool is significantly larger than the force component in the radial direction of the tool. Thus, for a relatively large axial offset Δk, a relatively small radial offset Δr of the cutting insert is brought about. The angle β1 is equal to roughly 35° in the shown embodiment so that a relatively small displacement movement of the double wedge pin 12, 15 occurs with respect to the screw-in movement of the pressure screw 10 and the pressure wedge 10a, an even force transfer to the lateral wall 22 of the cutting insert 2 being ensured in this manner. The axial offset Δk is transformed due to the small angle α1 only to a small part [small extent] into a radial offset Δr of the cutting insert, a fine adjustability of the radial position of the cutting insert being ensured in this manner.

In order to restrain and adjust the indexable insert, the following procedure is followed:

When inserting the exchangeable cutting insert 2, the screw 4 is tightened until the indexable culling insert 2 is forced on its lateral walls 22 and 24 against the adjustment wedge 12 or rather a radial guide surface, as can be recognized in the offset Δv of the grip head 40 in FIG. 7. Subsequently, the fine setting of the position of the cutting insert 2 takes place by means of the pressure screw 10. After the cutting insert 2 has been adjusted to the desired final position, the final position is fixed by tightening the tension screw 40 on the TORX® or other 6-point star-shaped pattern receptacle 41. In order to accommodate the double wedge pin 12, 15, an axial drill hole 33 is provided in the tool support 3; and to accommodate the pressure screw 10, a threaded hole 39 extending radially thereto which narrows down to a guide receptacle corresponding to the pressure pin 10a. In order to allow simpler exchange of the double wedge pin 12, 15, moreover, an ejection spring 18 is provided in the double wedge receptacle 33 which presses the double wedge pin 12, 15 out of its receptacle 33 when loosening the pressure screw 11 and removing the cutting insert 2.

FIGS. 8 to 12 show a further embodiment of the invention, the adjustment mechanism or rather the clamping and adjustment apparatus having added to it a nut part 136 with which the tension screw 104 for prestressing and fastening the cutting insert 102 is screwed down. The nut part 136 is formed as a cylinder pin which is arranged in a nut part guide receptacle 136 below the cutting insert (see FIGS. 9 and 12). The nut part guide receptacle 138 extends in the plane XII—XII in FIG. 9, which is shown in FIG. 12 in detail in a direction E which is offset by the angle $\epsilon 1$ with respect to the plane of the seat surface 130 or rather bottom surface 120 of the cutting insert. The nut part guide direction E thus has a component $E_k$ parallel to the plane of the seat surface 120 towards the wedge surface 122 of the adjustment wedge 112 and a component $E_s$ in the direction of the screw axis S of the tension screw 104.

When prestressing the cutting insert 102 against the seat surface 120 and the wedge surface 122, the tension screw 104 is screwed into the nut part 136 so that the grip head 140 of the tension screw 104 forces the cutting insert 102 towards the adjustment wedge 112. During subsequent adjustment of the position of the cutting insert 102 by means of the pressure screw 110 and the double wedge pin 112, 115, a force is transferred to the grip head 140 of the tension screw 104 which, however, no longer leads to a bending loading of the tension screw 104, but rather at least partially to a compensation movement of the tension screw together with the nut part 136, the tension screw 104 being put under tension via the clamping between nut part 136 and the screw head 140 instead of being subjected to bending.

The through hole between the cutting insert seat and nut part 136 is configured to have play. It has been shown that in this manner the area in which a fine adjustment is possible via the double wedge arrangement 101 can be substantially enlarged. For example, for a tool diameter of 40 mm, values in a range from −0.1 mm to 0.35 mm could be set with the shown clamping and adjustment apparatus 101, simultaneously the required clamping force for secure positional fixing of the cutting insert 102 being present.

Even greater setting ranges can be attained with the embodiment of the invention shown in FIGS. 13 to 15 in which the clamping and adjustment apparatus is shown with many parts being identical to the previous drawings; however, the nut part 236 is guided in a plane XV—XV in FIG. 14 at an angle $\gamma 2$ with respect to the tool axis A in a corresponding guide receptacle 238. Besides the component $E_s$ given by the angle $\epsilon 2$ in the direction of the screw axis S, the nut part guide direction E thus has also a component $E_k$ radial to the tool axis A as well as a component $E_f$ axial to the tool axis. When tightening the clamping and adjustment apparatus by means of the pressure screw 210, the compensation made possible by the nut part 236 takes place not only in the direction towards the adjustment wedge 212 but also in the direction towards the guide surface 232.

In the previously shown embodiments, the actuation and adjustment wedge surfaces 16, 14; 116, 114; 216, 214 were arranged in each case concavely on the double wedge pin of the clamping and adjustment apparatuses found there. This formation of the wedge surfaces is suitable for use in common exchangeable cutting inserts or indexable cutting inserts with a diamond shape which are arranged with an essentially radial main cutter (H in FIG. 1) in a plane which is parallel to the tool axis A since the wedge angle of the adjustment wedge is then configured corresponding to the diamond shape so that the double wedge pin of the clamping and adjustment apparatus extends in a space-saving manner in the axial direction A of the tool.

However, the clamping and adjustment apparatus according to the invention is usable for different constructions and arrangements of the cutter insert or rather cutting insert on the cutter support. For example, an embodiment of the invention is shown in FIGS. 16 to 18 in which the adjustment wedge surface 314 extends convexly with respect to the actuation wedge surface 316. By means of this arrangement, a kinematic return is brought about, i.e., that the double wedge 312, 315 drifts under pressure of the pressure screw 310 or rather of the pressure pin 310a in the axial direction towards the tool point. The displacement direction V extends here at the angle $\phi$ with respect to the tool axis A. The displacement direction is determined by the desired angle $\alpha 3$ between the displacement direction and wedge surface 314 as well as by the form and position of the cutting insert 302. Whereas in the previously shown embodiments, diamond-shaped cutting inserts were chosen so that a displacement direction parallel to the tool axis resulted for a suitably chosen wedge angle ($\alpha 1$), the cutting insert 302 has an essentially rectangular form so that the angle $\phi$ between the tool axis A and displacement direction V corresponds to the angle $\alpha 3$ between the displacement direction V and the wedge surface 314.

The force introduction on the beveled running surface 319 of the pressure screw 310 takes place here at the angle $\beta 3$ to the displacement direction V of the double wedge 312, 315, and the force application on the wedge surface 314 of the adjustment wedge 312 into the cutting insert 302 at the angle $\alpha 3$ so that essentially the transfer relationships [ratios] previously described above ensue:

For a relatively large wedge displacement $\Delta k$, a relatively small radial offset $\Delta r$ of the cutting insert 302 is attained so that this axial offset $\Delta r$ can be set very finely. Here, the maximum displacement of the double wedge 312, 315 is limited by a stop 360 which upon reaching the maximum displacement $\delta k$ stops on the cutting insert 302 so that the operator of the pressure screw 310 obtains a warning signal due to the sudden jump in resistance while tightening the screw. Subsequently, a second stop 361 is provided on the actuation wedge surface 316 which stop 361 limits the movement of the double wedge 312, 315 lastly completely.

Figure 23:
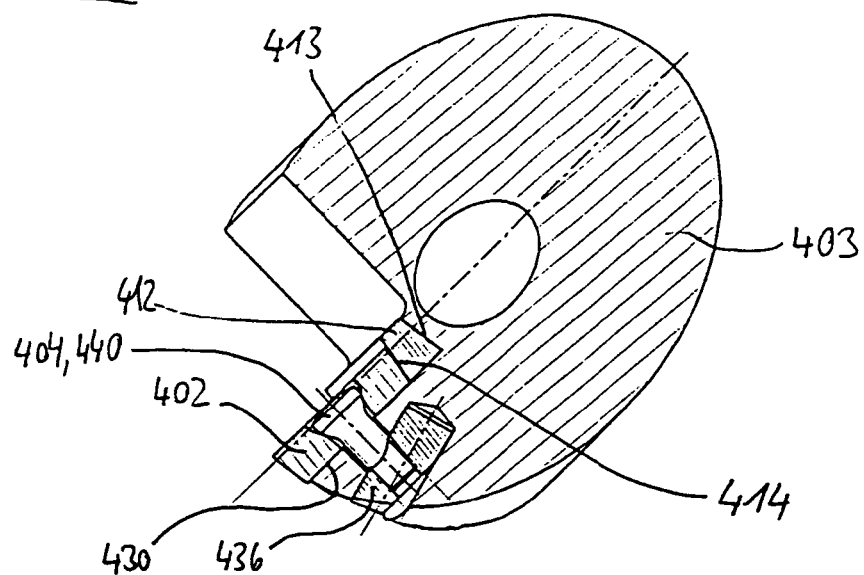
FIG. 23: A sectional view in the plane XXII—XXII drawn in FIG. 22.
Figure 24:
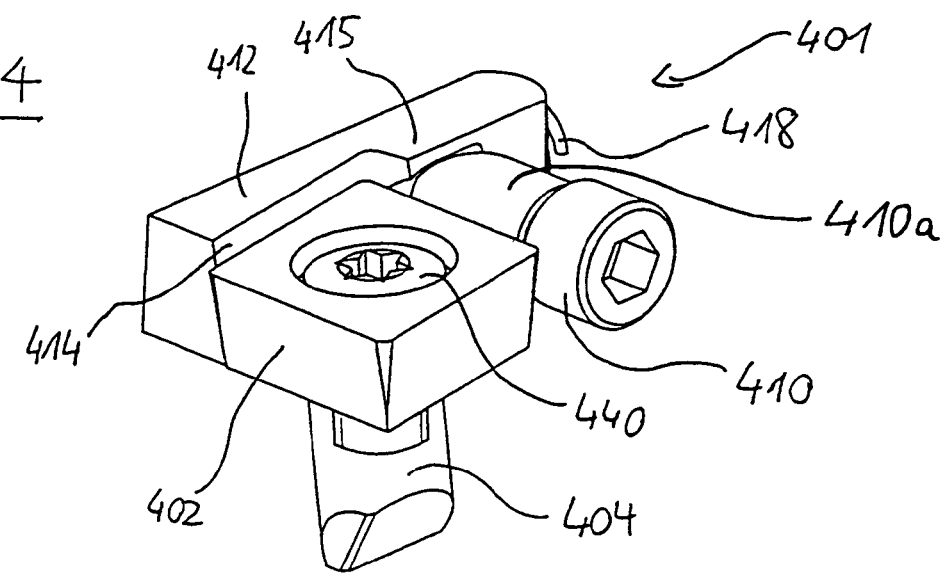
FIG. 24: A detailed view corresponding to FIG. 6.
Figure 25:
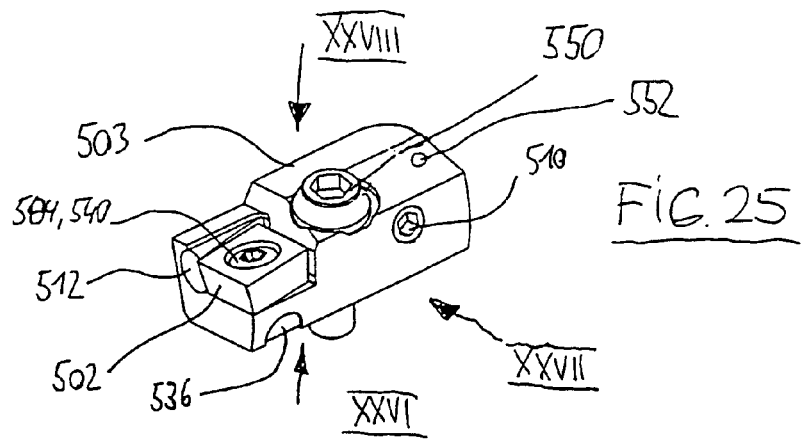
FIG. 25: An isometric view of an embodiment of a tool cartridge according to the invention.
Figure 26:
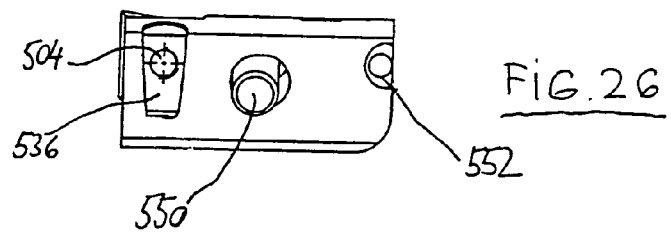
FIG. 26: A bottom view of the tool cartridge.
Figure 27:
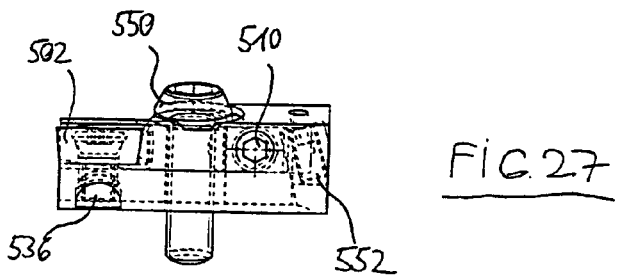
FIG. 27: A lateral view of the tool cartridge.
Figure 28:
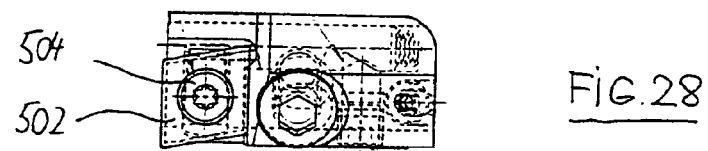
FIG. 28: A top view of the tool cartridge.
Figure 29:
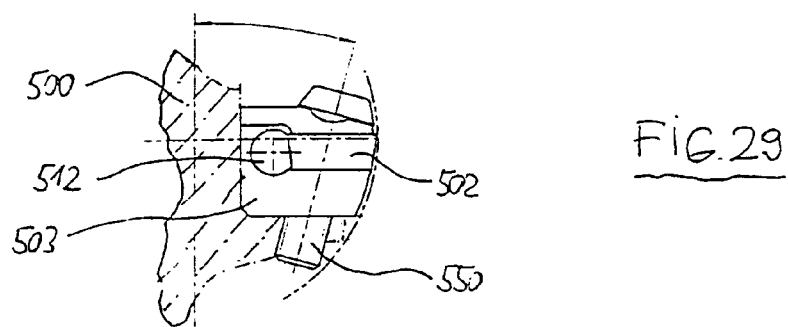
FIG. 29: A further lateral view of the tool cartridge in the installed state.

In the previously shown embodiments, the double wedge 12, 15; 112, 115; 212, 215; 312, 315 was implemented as a cylinder pin on which corresponding recesses are left open for the wedges. The receptacle 33; 133; 233; 333 could thus be formed as a cylindrical drill hole in that the double wedge is guided in a loss-proof manner and supported against the tool member. An embodiment of the clamping and adjustment apparatus according to the invention with the double wedge 412, 415 with a trapezoidal cross-section in shown in FIGS. 19 to 24. The double wedge pin 412, 415 is actuated in turn via a pressure screw 410, the diamond-shaped cutting insert 402 being adjustable in terms of its radial position as a result. As a guide receptacle for the double wedge with the trapezoidal cross section (see FIGS. 21 and 23), a routed groove is provided, the adjustment wedge 412 pressing with an adjustment wedge surface 414 against the cutting insert 402 and being supported by means of the surface 413 on the tool support 403, the surface 414 being tilted at the free angle determined by the cutting insert to the inside and surface 413 with which the adjustment wedge 412 is supported on the tool support, in the opposite direction at the angle $\delta$, so that along with the pressure screw 410 a loss prevention is formed for the double wedge.

The nut part guide direction is on a plane XXIII—XXIII extending diagonally through the cutting insert which is offset at the angle $\gamma 4$ with respect to the tool axis A so that the narrow plate 402 is pressed on its lateral walls 422, 424 evenly on the adjustment wedge surface 414 and the radial guide surface and the resulting loading of the tension screw 404 by means of the nut part 436 can be transformed at least partially into a tensile load. With common cutting inserts and positions, the angle γ4 is, say, 50°.

Moreover, FIGS. 25 to 29 show a tool cartridge 503 for installation on a corresponding cutting tool, e.g., a step reamer. The tool cartridge 503 can be prestressed and fastened by means of a tension screw 550 against the tool member 500 (see FIG. 29) and carries a cutting insert 502 which is adjustable, analogously to the embodiments shown in FIGS. 9 to 12, by means of a pressure screw 510 via a double wedge with an adjustment wedge 512. A nut part 536 is provided by means of which the transverse forces which are laterally introduced on the tension screw 504 are compensated. The nut part 536 is flattened on the underside so that it fits in a receptacle which arises upon installation between the tool cartridge 503 and the tool member.

In addition to the clamping and adjustment apparatus for radial adjustment of the position of the cutting insert 502 on the tool cartridge 503, a second clamping and adjustment apparatus 552 is provided with which the axial position of the cartridge 503 can be set with respect to the tool support. Here, a pressure screw with a beveled surface can be screwed in through the drill hole 552 which screw presses, say, via a corresponding displacement wedge on a shoulder provided on the tool support and thus sets the axial position of the cartridge 503 on the tool support 500.

Figure 30:
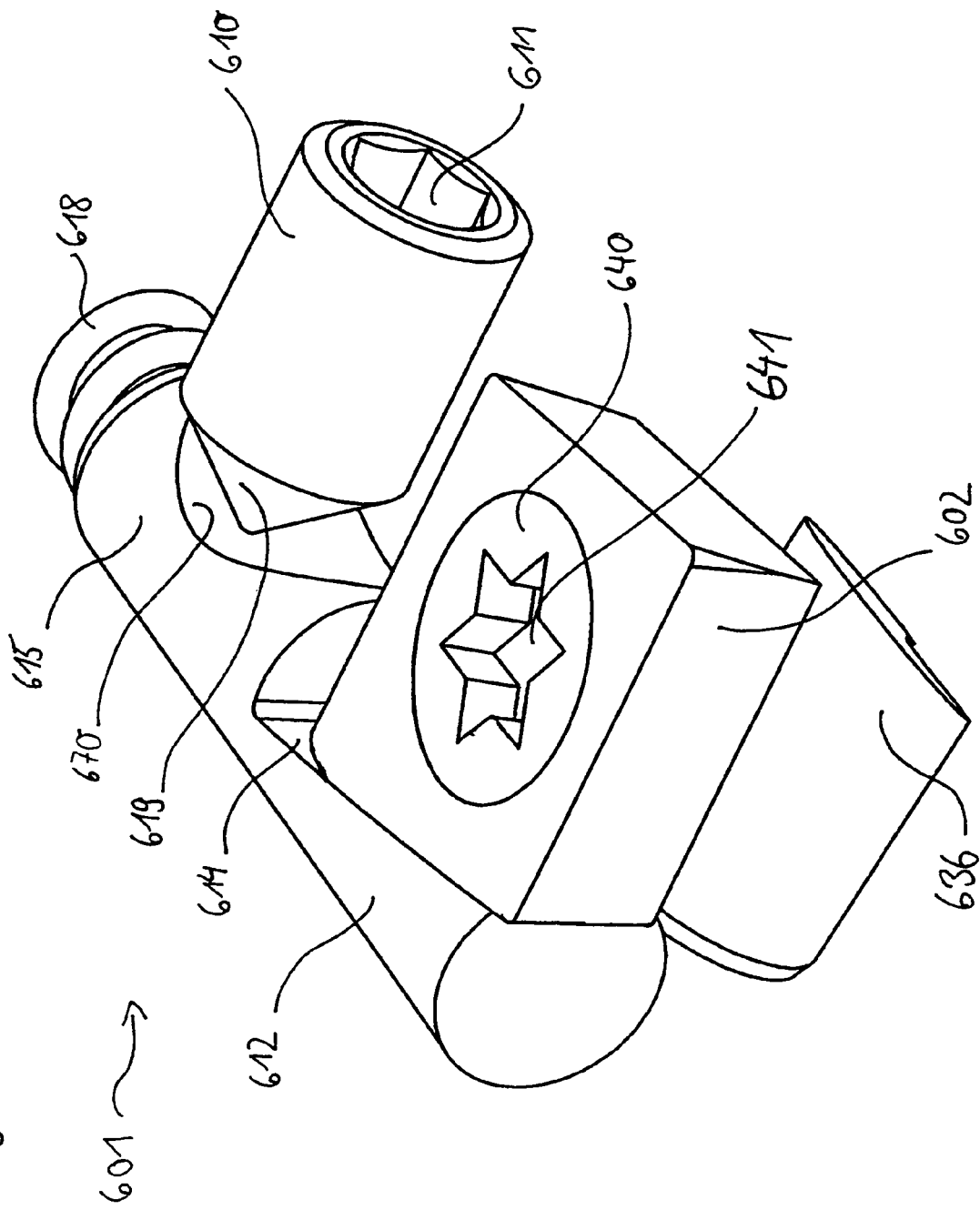
FIG. 30: A detailed view corresponding to FIG. 6 of a further embodiment of the invention.
Figure 31:
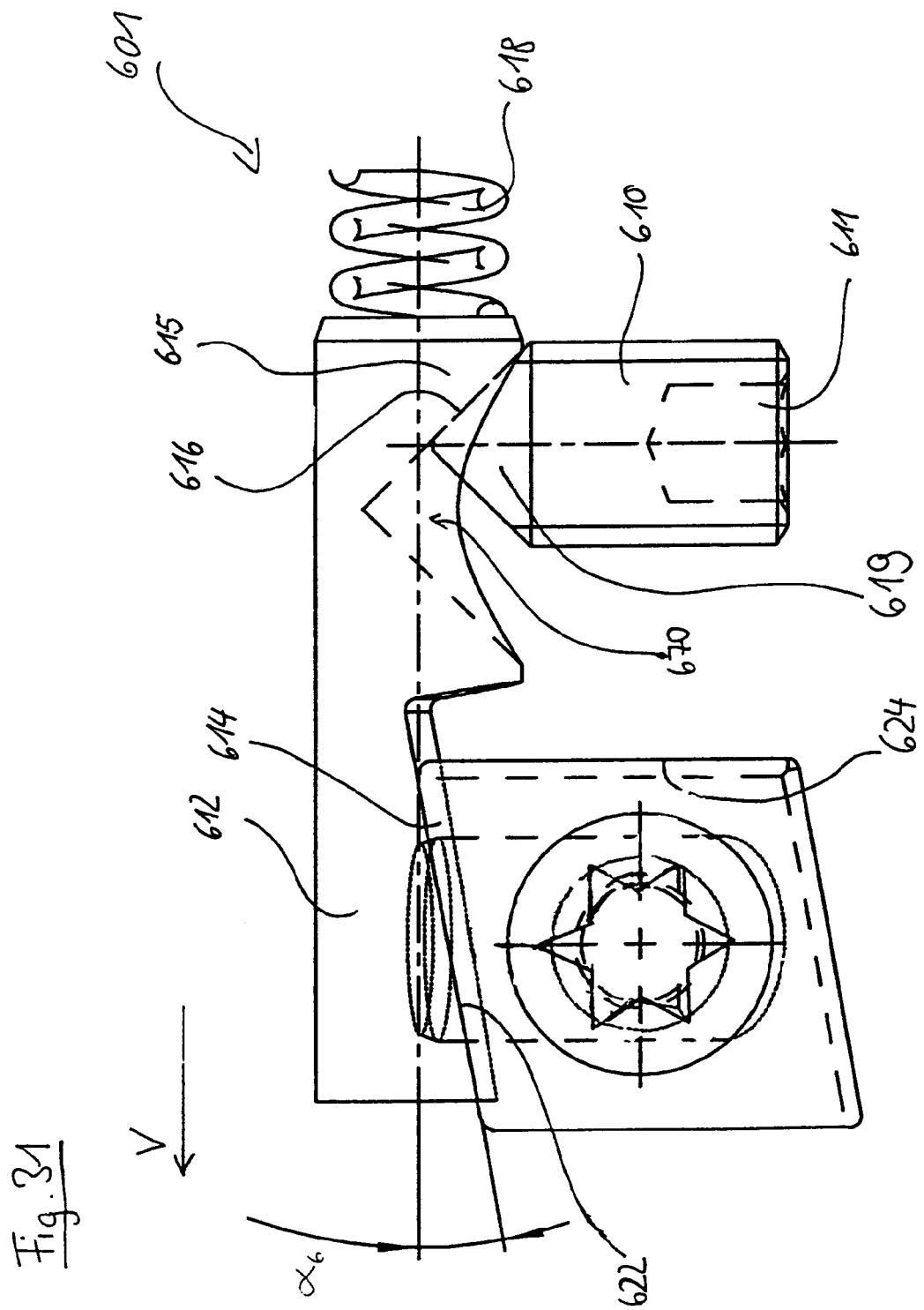
FIG. 31: A detailed view corresponding to FIG. 7.

Finally, FIGS. 30 and 31 show a further embodiment of the clamping and adjustment apparatus 601 according to the invention. Deviating from the previous embodiments, a pressure screw 610 configured as a headless screw is used which has on its front side a pressure surface 619 formed as a conical surface. Here, the actuation wedge 615 is part of a conical recess 670 on the double wedge pin 612, 615. In this manner, the need for a pressure wedge between the pressure screw and actuation wedge is eliminated. The cone of the recess 670 which forms the actuation wedge 615 has the same cone angle as the conical pressure surface 619 so that when the pressure screw 610 is being screwed in, the pressure surface 619 comes into abutment on the line-shaped actuation wedge surface 616 and a good transfer of force is guaranteed.

Naturally, further modifications which were not shown are possible within the scope of the invention.

For example, an additional axial adjustment device could be provided besides the radial adjustment device also in tools without a tool cartridge.

Moreover, for example, on the adjustment wedge or on the perimeter of the drill hole accommodating the pressure screw, a scale could be provided. Through alignment with a corresponding marking on the tool support or rather on the pressure screw, then, after measuring the position of the cutting edge in the prestressed state, it can be read off how far the clamping and adjustment apparatus still has to be adjusted until reaching the desired position. Direct control of the cutting edge adjustment can thus be carried out which replaces an iterative cutter setting (tighten the screw, measure the cutter adjustment on the cutter, readjust the screw, etc.).

The presented clamping and adjustment apparatus is suitable, as is the shown cutting tool and the shown tool cartridge, particularly for use in fine machining work which is performed, say, by reamers, particularly when using step reamers. However, the invention is advantageous also in drills, millers or lathe chisels in which there is a particularly emphasis on dimensionally accurate cutting. In tools which are fitted with a plurality of cutter inserts, it is imaginable to equip each or for example just one of the cutter inserts according to the invention. Here, a dual-axis setting of the cutting position by means of two separate clamping and adjustment apparatuses on a cutter insert is also imaginable.

In summary, those features have been listed in which the invention is embodied individually and in any type of combination:

A clamping and adjustment apparatus (1; 101; 201; 301; 401; 501) for a cutting tool, a plate-shaped cutter insert (2; 102; 202; 302; 402; 502) being prestressable and fastenable by means of a prestressing and fastening device (4; 104; 204; 304; 404; 504), particularly a tension screw (4; 104; 204; 304; 404; 504), with its bottom surface (20; 120; 220; 320; 420; 520) against a seat surface (30; 130; 230; 330; 430; 530) such that it is supported with lateral wall sections (22, 24; 122, 124; 222, 224; 322, 324; 422, 424; 522, 524) in a positionally fixed manner on a cutter support (3; 103; 203; 303; 403; 503) and can be adjusted.

An adjustment wedge (12; 112; 212; 312; 412; 512) can be actuated by means of a pressure screw (10; 110; 210; 310; 410; 510) in a direction (V) that extends essentially parallel to the seat surface (30; 130; 230; 330; 430; 530).

The adjustment wedge (12; 112; 212; 312; 412; 512) is accommodated in the cutter support (3; 103; 203; 303; 403; 503) in a form-fitted and displaceable manner.

The cutter insert (2; 102; 202; 302; 402; 502) is supported over [alternative: by means of] the adjustment wedge (12; 112; 212; 312; 412; 512).

The cutter insert (2; 102; 202; 302; 402; 502) is pressingly prestressable and fastenable by means of a grip head (40; 140; 240; 340; 440; 540) with a first lateral wall section (22; 122; 222; 322; 422; 522) against an adjustment wedge surface (14; 114; 214; 314; 414; 514) of the adjustment wedge (12; 112; 212; 312; 412; 512).

The cutter insert (2; 102; 202; 302; 402; 502) is pressingly prestressable and fastenable by means of a grip head (40; 140; 240; 340; 440; 540) with a second lateral wall section (24; 124; 224; 324; 424; 524) formed at an angle to the first lateral wall section (22; 122; 222; 322; 422; 522) against a guide stop arrangement.

The guide stop arrangement is a guide surface (32; 132; 232; 332; 432; 532) on the cutter support (3; 103; 203; 303; 403; 503).

The cutter insert (2; 102; 202; 302; 402; 502) is formed as a diamond-shaped cutting insert.

A sharp-edged corner of the cutter insert (2; 102; 202; 402; 502) is bordered by the adjustment wedge surface (14; 114; 214; 414; 514) and the guide surface (32; 132; 232; 432; 532).

On the adjustment wedge surface (14; 114; 214; 314; 414; 514) and the guide surface (32; 132; 232; 332; 432; 532), the lateral walls of the cutting insert are supported essentially all over.

The displacement direction (V) of the adjustment wedge (12; 112; 212; 312; 412; 512) deviates maximally 75° from the axial direction (A), preferably by an angle (φ) of maximally 15° or is equal to the axial direction (A) of the tool.

Between the adjustment wedge surface (14; 114; 214; 314; 414; 514) and the actuation direction (V) of the adjustment wedge (12; 112; 212; 312; 412; 512), a wedge angle (α1; α3) of between 1° and 50°, particularly between 5° and 25°, is provided.

The pressure screw (10; 110; 210; 310; 410; 510) is arranged acting at an angle with respect to the adjustment wedge surface (14; 114; 214; 314; 414; 514) on a actuation wedge (15; 115; 215; 315; 415; 515).

The adjustment wedge (12; 112; 212; 312; 412; 512) is actuatable by means of the actuation wedge (15; 115; 215; 315; 415; 515).

The actuation wedge (15; 115; 215; 315; 415; 515) and the adjustment wedge (12; 112; 212; 312; 412; 512) are arranged in a common wedge receptacle (133; 233; 333; 433; 533) extending in the displacement direction (V).

The adjustment wedge (12; 112; 212; 312; 412; 512; 612) and the actuation wedge (15; 115; 215; 315; 415; 515; 615) are formed as recesses on a single-piece double wedge pin (12, 15; 112, 115; 212, 215; 312, 315; 412, 415; 512, 515; 612, 615).

The pressure screw (10; 110; 210; 310; 410; 510) extends from the tool perimeter essentially radially towards the tool axis (A).

The recesses on the double wedge pin (12, 15; 112, 115; 212, 215; 312, 315; 412, 415; 512, 515; 612, 615) are formed to be wedge-shaped.

The actuation wedge (619) is formed by a conical recess (670).

The pressure screw (610) has a front-side pressure surface (619) which is formed to be conical surface-shaped so that the pressure screw (610) abuts rotatably on its pressure surface (619) on the actuation wedge (615).

The cone angle of the pressure surface (619) corresponds to the cone angle of the conical recess (670) so that the pressure screw (610) abuts in a line shape on a actuation wedge surface (616).

The pressure screw (10; 110; 210; 310; 410; 510) is pressable on the front side on a coaxially guided pressure wedge (10a; 110a; 310a; 410a) which has a pressure surface (19; 319) for pressure transfer to the actuation wedge surface (16; 116; 316; 416) of the actuation wedge (15; 115; 215; 315; 415; 515).

The pressure surface (19; 319) on the pressure wedge (10a; 110a; 310a; 410a) is adapted to the actuation wedge surface (16; 116; 316; 416) such that it abuts two-dimensionally.

The adjustment wedge angle ($\alpha_1$; $\alpha_3$) is smaller than the actuation wedge angle ($\beta_1$; $\beta_3$).

The adjustment wedge surface (14; 114; 214; 414; 514) and the actuation wedge surface (16; 116; 216; 416; 516) are provided concavely on the double wedge pin (12, 15; 112, 115; 212, 215; 412, 415; 512, 515).

The adjustment wedge surface (314) and the actuation wedge surface (316) are provided convexly on the double wedge pin (312, 315).

The double wedge pin (12, 15; 112, 115; 212, 215; 412, 415; 512, 515) is formed as a cylinder pin with wedge-shaped recesses.

The double wedge pin (12, 15; 112, 115; 212, 215; 412, 415; 512, 515) is arranged in a corresponding wedge receptacle drill hole (133; 233; 333; 533).

The double wedge pin (412, 415) is arranged as a pin with a trapezoidal cross-section.

The double wedge pin (412, 415) is arranged perpendicularly to the seat surface (430) secured in a corresponding wedge receptacle (438).

An ejection spring (18; 418) presses with its spring force contrary to the displacement direction (V) against the adjustment wedge (12; 412).

A limiting stop (361) limits the maximum displacement ($\Delta k$) of the adjustment wedge (312).

A cutting tool, particularly a rotationally driven cutting tool, has at least one clamping and adjustment apparatus (101; 201; 301; 401; 501), a plate-shaped cutter insert (102; 202; 302; 402; 502) being prestressable and fastenable by means of a tension screw (104; 204; 304; 404; 504) with its bottom surface (120; 220; 320; 420; 520) against a seat surface (130; 230; 330; 430; 530) such that it is supported with a first lateral wall section (122; 222; 322; 422; 522) in a positionally fixed manner on a surface (114; 214; 314; 414; 514) of the clamping and adjustment apparatus (101; 201; 301; 401; 501).

The tension screw (104; 204; 304; 404; 504) can be screwed down through a through hole (134; 234; 334; 434; 534) with a nut part (136; 236; 336; 436; 536).

The nut part (136; 236; 336; 436; 536) is displaceably supported in the cutter support (103; 203; 303; 403; 503) in a nut part guide receptacle (138; 238; 338; 438; 538) with a degree of freedom in a nut part guide direction (E).

The nut part guide direction (E) has a component ($E_k$) perpendicular to the first lateral wall section (122; 222; 322; 422; 522).

The nut part guide receptacle (138; 238; 338; 438; 538) is a drill hole (103; 203; 303; 403; 503) introduced in nut part guide direction (E) from out of the outer circumference of the cutter support (103; 203; 303; 403; 503).

The nut part (136; 236; 336; 436; 536) is a pin (136; 236; 336; 436; 536) which is displaceable in the drill hole.

The cutter insert (202; 402) is supported on a second lateral wall section (224; 424) on a guide surface (232; 432).

The guide direction (E) has a component ($E_f$) perpendicular to the second lateral wall section (224; 424).

The nut part guide receptacle (238; 438) points towards a sharp-edged corner of the cutter insert (202; 402) which is bordered by the first (222; 422) and the second lateral wall section (224; 424).

The guide direction (E) has a component ($E_s$) in the direction of the axis (S) of the tension screw (104; 204; 304; 404; 504).

A ratio of the component ($E_s$) in the direction of the axis (S) of the tension screw (104; 204; 304; 404; 504) to the remaining components ($E_k$, $E_f$) of the guide direction (E) is equal to 10–50%, particularly 20–35%, e.g., 25–30%.

The cutting tool is configured as a step tool.

The cutting insert to be set (102; 202; 302; 402; 502) is provided on the step.

A tool cartridge (503) is equipped with a clamping and adjustment apparatus (501), particularly according to one of the preceding features.

A tool cartridge (503) is used for installation in a cutting tool.

A plate-shaped cutter insert (502) is prestressable and fastenable by means of a prestressing and fastening apparatus (504), particularly a tension screw (504), with its bottom surface (520) against a seat surface (530) such that it is supported with lateral wall sections (522, 524) in a positionally fixed manner on the cartridge (503).

An adjustment wedge (512) which can be actuated by means of a pressure screw (510) is accommodated in the tool cartridge (503) in a form-fitted and displaceable manner.

Over the adjustment wedge (512), the cutter insert (502) is supported with a first lateral wall section (522).

A tension screw (550) is provided for positionally-determined fastening of the tool cartridge (503) on the tool (500).

The axial position of the tool cartridge (503) can be set on the tool (500) with a second clamping and adjustment apparatus (552).

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

The invention claimed is:

1. A clamping and adjustment apparatus for a cutting tool, comprising:
a plate-shaped cutter insert being prestressable and fastenable by means of a prestressing and fastening device defining a tension screw with its bottom surface against a seat surface such that it is supported with lateral wall sections in a positionally fixed manner on a cutter support, comprising:
an adjustment wedge which can be actuated by means of a pressure screw in a direction (V) that extends essentially parallel to the seat surface;
wherein said adjustment wedge is accommodated in the cutter support in a form-fitted and displaceable manner over which the cutter insert is supported and adjusted;
wherein the pressure screw is arranged acting at an angle with respect to the adjustment wedge surface on a actuation wedge by means of which the adjustment wedge is actuatable;
wherein the actuation wedge and the adjustment wedge are arranged in a common wedge receptacle extending in the displacement direction (V); and
wherein the adjustment wedge and the actuation wedge are formed as recesses on a single-piece double wedge pin.

2. The clamping and adjustment apparatus according to claim 1, wherein the cutter insert is pressable by means of a grip head by the prestressing and fastening device with a first lateral wall section against an adjustment wedge surface of the adjustment wedge.

3. The clamping and adjustment apparatus according to claim 1, wherein the cutter insert is pressingly prestressable and fastenable by means of a grip head in the closed state of the prestressing and fastening device with a second lateral wall section formed at an angle to the first lateral wall section against a guide stop arrangement, including a guide surface on the cutter support.

4. The clamping and adjustment apparatus according to claim 3, wherein a sharp-edged corner of the cutter insert is bordered by the adjustment wedge surface and the guide surface on which the lateral walls of the cutting insert are supported essentially all over, the displacement direction (V) of the adjustment wedge deviating maximally 75° from the axial direction (A).

5. The clamping and adjustment apparatus according to claim 1, wherein between the adjustment wedge surface and the actuation direction (V) of the adjustment wedge, a wedge angle ($\alpha_1$; $\alpha_3$; $\alpha_6$) of about between 1° and 50°.

6. The clamping and adjustment apparatus according to claim 5, wherein said wedge angle is about between 5° and 25°.

7. The clamping and adjustment apparatus according to claim 1, wherein the pressure screw extends from the tool perimeter essentially radially towards the tool axis (A).

8. The clamping and adjustment apparatus according to claim 7, wherein the pressure screw is pressable on the front side on a coaxially guided pressure wedge which has a pressure surface for pressure transfer to the actuation wedge surface of the actuation wedge.

9. The clamping and adjustment apparatus according to claim 8, wherein the pressure surface on the pressure wedge is adapted to the actuation wedge surface such that it abuts two-dimensionally.

10. The clamping and adjustment apparatus according to claim 7, wherein the actuation wedge is formed by a conical recess.

11. The clamping and adjustment apparatus according to claim 1, wherein the recesses on the double wedge pin are formed to be wedge-shaped.

12. The clamping and adjustment apparatus according to claim 11, wherein pressure screw has a front-side pressure surface which is formed to be conical surface-shaped so that the pressure screw abuts rotatably on its pressure surface on the actuation wedge.

13. The clamping and adjustment apparatus according to claim 12, wherein the cone angle of the pressure surface corresponds to the cone angle of the conical recess so that the pressure screw abuts in a line shape on an actuation wedge surface.

14. The clamping and adjustment apparatus according to claim 1, wherein an adjustment wedge angle ($\alpha_1$; $\alpha_3$; $\alpha_6$) is smaller than an actuation wedge angle ($\beta_1$; $\beta_3$).

15. The clamping and adjustment apparatus according to claim 1, wherein the adjustment wedge surface and the actuation wedge surface are provided concavely on the double wedge pin.

16. The clamping and adjustment apparatus according to claim 1, wherein the adjustment wedge surface and the actuation wedge surface are provided convexly on the double wedge pin.

17. The clamping and adjustment apparatus according to claim 1, wherein the double wedge pin is formed as a cylinder pin and is arranged in a corresponding wedge receptacle drill hole.

18. The clamping and adjustment apparatus according to claim 1, wherein the double wedge pin is arranged as a pin with a trapezoidal cross-section, which is arranged perpendicularly to the seat surface secured in a corresponding wedge receptacle.

19. The clamping and adjustment apparatus according to claim 1, wherein an ejection spring whose spring force acts contrary to the displacement direction (V) against the adjustment wedge.

20. The clamping and adjustment apparatus according to claim 1, wherein a limiting stop which limits the maximum displacement ($\Delta k$) of the adjustment wedge.

21. A rotationally driven cutting tool, with at least one clamping and adjustment apparatus according to claim 1, wherein the tension screw is screwed down through a through hole with a nut part which is displaceably supported in the cutter support in a nut part guide receptacle with a degree of freedom in a nut part guide direction (E) which has a component ($E_k$) perpendicular to the first lateral wall section.

22. The cutting tool according to claim 21, wherein the nut part guide receptacle is a drill hole introduced in nut part guide direction (E) from out of the outer circumference of the cutter support and the nut part is a pin which is displaceable in the drill hole.

23. The cutting tool according to claim 24, wherein the nut part guide receptacle extends towards a sharp-edged corner of the cutter insert which is bordered by the first and the second lateral wall section.

24. The cutting tool according to claim 21, wherein the cutter insert is supported on a second lateral wall section on a guide surface, the guide direction (E) having a component ($E_f$) perpendicular to the second lateral wall section.

25. The cutting tool according to claim 21, wherein the guide direction (E) has a component ($E_s$) in the direction of the axis (S) of the tension screw.

26. The cutting tool according to claim 21, wherein a ratio of the component ($E_s$) in the direction of the axis (S) of the tension screw to the remaining components ($E_k$, $E_f$) of the guide direction (E) of about 10–50%.

27. The cutting tool according to claim 26, wherein the ratio is about 20–35%.

28. The cutting tool according to claim 27, wherein the ratio is about 25–30%.

29. The cutting tool according to claim 21, wherein the tool is configured as a step tool, the cutting insert to be set being provided on the step.

30. A tool cartridge for installation in a cutting tool, according to claim 21, wherein the plate-shaped cutter insert has its bottom surface against a seat surface such that it is supported with lateral wall sections in a positionally fixed manner on the cartridge, and the adjustment wedge is accommodated in the tool cartridge in a form-fitted and displaceable manner over which the cutter insert is supported with a first lateral wall section.

31. The tool cartridge according to claim 30, wherein a tension screw for positionally-determined fastening of the tool cartridge is on the tool.

32. The tool cartridge according to claim 30, wherein a second clamping and adjustment apparatus with which the axial position of the tool cartridge is set on the tool.

33. The clamping and adjustment apparatus according to claim 1, wherein between the adjustment wedge surface and the actuation direction (V) of the adjustment wedge, a wedge angle ($\alpha_1$; $\alpha_3$; $\alpha_6$) of about 5° and 25° is provided.

34. A clamping and adjustment apparatus for a cutting tool, with a cutter support on which a plate-shaped cutter insert is prestressable and fastenable by means of a prestressing and fastening device with its bottom surface against a seat surface such that it is supported by lateral wall sections in a positionaly fixed manner on the cutter support, comprising:

an adjustment wedge, to be accommodated in the cutter support in a form-fitted and displaceable manner, which can be actuated in a direction (V) that extends essentially parallel to the seat surface wherein the cutter insert is supported and adjusted;

a pressure screw for actuating the adjustment wedge; and wherein the clamping and adjustment apparatus includes an actuation wedge wherein the adjustment wedge may be actuated, and the pressure screw acts on the actuation wedge at an angle to the adjustment wedge, and the adjustment wedge and the actuation wedge are formed as recesses on a double wedge pin.

35. A clamping and adjustment apparatus for a cutting tool, with a cutter support on which a plate-shaped cutter insert is prestressable and fastenable by a prestressing and fastening device such that a first surface of the insert is against a seat surface so the insert is supported by lateral wall sections in a positionaly fixed manner on the cutter support, the apparatus comprising:

an adjustment wedge, to be accommodated in the cutter support in a form-fitted and displaceable manner, which can be actuated in a direction (V) that extends essentially parallel to the seat surface;

a screw for actuating the adjustment wedge; and wherein the clamping and adjustment apparatus further includes an actuation wedge, wherein the adjustment wedge may be actuated, and the pressure screw acts on the actuation wedge at an angle to the adjustment wedge, and the adjustment wedge and the actuation wedge are formed as recesses on a double wedge pin.

* * * * *